(12) United States Patent
Spiessbach et al.

(10) Patent No.: US 10,157,038 B2
(45) Date of Patent: *Dec. 18, 2018

(54) INTERACTIVE KEYWORD CLOUD

(71) Applicant: Patient Prism LLC, Tampa, FL (US)

(72) Inventors: Michael G. Spiessbach, Tampa, FL (US); Amol Nirgudkar, Tampa, FL (US)

(73) Assignee: Patient Prism LLC, Tampa, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/022,328

(22) Filed: Jun. 28, 2018

(65) Prior Publication Data
US 2018/0307461 A1    Oct. 25, 2018

Related U.S. Application Data

(63) Continuation of application No. 15/790,442, filed on Oct. 23, 2017, now Pat. No. 10,013,234, which is a
(Continued)

(51) Int. Cl.
*G06F 3/16*       (2006.01)
*G06Q 30/02*      (2012.01)
(Continued)

(52) U.S. Cl.
CPC ............ *G06F 3/165* (2013.01); *G06F 3/0482* (2013.01); *G06F 3/04812* (2013.01);
(Continued)

(58) Field of Classification Search
CPC ...................................................... G06F 3/165
See application file for complete search history.

(56) References Cited

U.S. PATENT DOCUMENTS 8,687,776 B1 *  4/2014  Reynolds ............... G06Q 30/02
                                                    379/88.18
9,870,405 B2 *  1/2018  Gannu ............... G06F 17/30702
(Continued)

OTHER PUBLICATIONS

USPTO, "U.S. Appl. No. 15/790,442 Notice of Allowance dated Mar. 1, 2018", 19 pages.
(Continued)

*Primary Examiner* — David E Choi
(74) *Attorney, Agent, or Firm* — Strategic Patents, P.C.

(57) ABSTRACT

Merchant/consumer calls may be recorded and evaluated according to a variety of criteria. The call recordings and analyses thereof, as well as consumer tracking information, may be displayed in a user interface of a web-based online portal for convenience in evaluating the use and efficacy of marketing channels as well as the quality of merchant/consumer interactions. In an aspect, the user interface provides a representation of a variety of telephone calls as an interactive keyword cloud that presents business-value-specific keywords targeted for detection during such telephone calls. The keyword cloud may depict keywords in a range of colors, sizes, and relative positioning to connote varied degrees of significance, such as a relative rate of occurrence of keywords in the represented telephone calls. Each keyword in the keyword cloud may contain a hyperlink to related content such as a listing of telephone calls containing the keyword.

20 Claims, 25 Drawing Sheets

Related U.S. Application Data continuation of application No. 15/377,484, filed on Dec. 13, 2016.

(60) Provisional application No. 62/311,331, filed on Mar. 21, 2016, provisional application No. 62/368,431, filed on Jul. 29, 2016.

(51) Int. Cl.

| | |
|---|---|
| *H04M 3/42* | (2006.01) |
| *H04M 3/51* | (2006.01) |
| *G10L 21/12* | (2013.01) |
| *H04L 29/08* | (2006.01) |
| *G06F 17/24* | (2006.01) |
| *G10L 15/08* | (2006.01) |
| *G06F 3/0481* | (2013.01) |
| *G06F 3/0482* | (2013.01) |
| *G06F 17/22* | (2006.01) |

(52) U.S. Cl.
CPC ........ *G06F 17/2235* (2013.01); *G06F 17/241* (2013.01); *G06Q 30/0201* (2013.01); *G10L 15/08* (2013.01); *G10L 21/12* (2013.01); *H04L 67/02* (2013.01); *H04L 67/146* (2013.01); *H04L 67/22* (2013.01); *H04M 3/42221* (2013.01); *H04M 3/5175* (2013.01); *G10L 2015/088* (2013.01); *H04M 2203/303* (2013.01); *H04M 2203/305* (2013.01); *H04M 2203/403* (2013.01)

(56) References Cited

U.S. PATENT DOCUMENTS

| | | | |
|---|---|---|---|
| 2011/0040562 | A1 | 2/2011 | Doyle et al. |
| 2012/0310926 | A1* | 12/2012 | Gannu ............. G06F 17/30702 707/723 |
| 2014/0025376 | A1 | 1/2014 | Wasserblat et al. |
| 2014/0172504 | A1* | 6/2014 | Duva ..................... H04M 3/51 705/7.31 |
| 2014/0192970 | A1 | 7/2014 | Castellani et al. |
| 2014/0304365 | A1* | 10/2014 | Khanna .................. H04L 67/02 709/217 |
| 2015/0195406 | A1 | 7/2015 | Gallino et al. |
| 2016/0026690 | A1 | 1/2016 | Unitt et al. |
| 2016/0173693 | A1* | 6/2016 | Spievak ............. G06Q 30/0202 379/265.09 |
| 2016/0277577 | A1 | 9/2016 | Dobson et al. |
| 2017/0269899 | A1* | 9/2017 | Spiessbach ....... H04M 3/42221 |
| 2017/0272571 | A1 | 9/2017 | Spiessbach et al. |
| 2018/0046433 | A1 | 2/2018 | Spiessbach et al. |
| 2018/0095621 | A1 | 4/2018 | Ryan et al. |

OTHER PUBLICATIONS

USPTO, "U.S. Appl. No. 15/377,428, Non-Final Office Action dated Apr. 12, 2017", 12 pages.

USPTO, "U.S. Appl. No. 15/377,428 Notice of Allowance dated Oct. 12, 2017", 5 pages.

USPTO, "U.S. Appl. No. 15/377,484 Non-Final Office Action dated Aug. 27, 2018", 17 pages.

\* cited by examiner

Call Data 510

02/16/2016 03:39 PM EST  Talk Time: 00:04:38  Ring Time: 00:04:25

| Dialed | Caller | Location |
|--------|--------|----------|
| Website | (813)000-0000 | Tampa, FL |

Call Keywords 536

| Wisdom Teeth Extraction | New Patient Exam |

Call Basics 520

Identified
- ✓ Announce Name
- ✓ Name of Patient Asked
- ✓ Free Consultation
- ✓ Offer Appointment Times
- ✓ Insurance Mentioned Not Identified
- ✗ Any Discomfort
- ✗ Financing Options
- ✗ How Did you Hear About us?
- ✗ Insurance 2/3

Call Analysis 530

TELEPHONE

Reviewed By
[ Reviewer 1 ]

Reason not Connected
Not Set

Classification
New Patient Opportunity

Booking Status
Booked

Reason not Booked Note
Not Set

Patient Name [ Patient 1 ]

Connection Status
Connected

Answered By
[ Rep. 1 ]

Benefits Coverage
Insurance

Reason not Booked Note
Not Set

Referring Source
Website

Call Scoring 540

| Greeting | Engagement | Booked | Etiquette |
|----------|-----------|--------|-----------|
| 4 | 4 | 4 | 4 |

Opportunities Won/Lost 550

Opportunities Won - $4500

| New Patient - $2000 | Wisdom Teeth Extraction x4 - $2500 |

Opportunities Lost - $0

No Opportunities Lost

*FIG. 5*

Search Calls

Search Results

Show [10 ▼] Entries

Search: [____]

| Phone Number ↕ | Caller ↕ | Duration ↕ | Classification ↕ | Booking Status ↕ | Date ↕ |
|---|---|---|---|---|---|
| [Actions ▽] Website | (xxx) xxx-xxxx | 00:01:18 | New Patient Opportunity | Not Booked | 07/05/2016 12:13 PM EDT |
| [Actions ▽] Website | (xxx) xxx-xxxx | 00:01:39 | General Call | None | 07/05/2016 12:15 PM EDT |
| [Actions ▽] Website | (xxx) xxx-xxxx | 00:05:41 | New Patient Opportunity | Booked | 07/06/2016 08:27 AM EDT |
| [Actions ▽] Billboard | (xxx) xxx-xxxx | 00:04:45 | New Patient Opportunity | Not Booked | 07/08/2016 09:30 AM EDT |
| [Actions ▽] Website | (xxx) xxx-xxxx | 00:01:39 | New Patient Opportunity | Not Booked | 07/08/2016 10:11 AM EDT |
| [Actions ▽] T.V. Ad | (xxx) xxx-xxxx | 00:03:14 | General Call | None | 07/13/2016 11:47 AM EDT |

Showing 1 to 6 of 6 Entries

[Previous] [1] [Next]

*FIG. 8*

Phone Number Metrics 1100

Show [10 ▼] Metrics Per Page 1102

Search: [         ] 1104

| Phone Number 1110 | New Patient Opportunities 1120 | Existing Patient Opportunities 1130 | Not Connected 1140 | General 1150 |
|---|---|---|---|---|
| Website | 10 Opportunities - 10 Booked / 0 Not Booked | 7 Opportunities - 7 Booked / 0 Not Booked | 14 Not Connected | 6 General Calls |
| Billboard 1 | 2 Opportunities - 0 Booked / 2 Not Booked | 1 Opportunity - 1 Booked / 0 Not Booked | 0 Not Connected | 0 General Calls |
| Billboard 2 | 1 Opportunity - 1 Booked / 0 Not Booked | 0 Opportunities - 0 Booked / 0 Not Booked | 1 Not Connected | 1 General Call |
| Website | 1 Opportunity - 0 Booked / 1 Not Booked | 1 Opportunity - 1 Booked / 0 Not Booked | 1 Not Connected | 1 General Call |
| T.V. Ad | 1 Opportunity - 1 Booked / 0 Not Booked | 0 Opportunities - 0 Booked / 0 Not Booked | 0 Not Connected | 0 General Calls |

Showing 1 to 5 of 5 Metrics        [Previous] [Next]

*FIG. 11*

Staff Metrics

Show [10 ▼] Metrics Per Page                                    Search: [_____]

| Staff Member | New Patient Opportunities 1220 | Existing Patient Opportunities 1230 | General 1240 |
|---|---|---|---|
| Staff_1 | 9 Opportunities -7 Booked / 2 Not Booked | 6 Opportunities -6 Booked / 0 Not Booked | 7 General Calls |
| Staff_2 | 4 Opportunities -3 Booked / 1 Not Booked | 1 Opportunity -1 Booked / 0 Not Booked | 1 General Call |
| Staff_3 | 0 Opportunities -0 Booked / 0 Not Booked | 1 Opportunity -1 Booked / 0 Not Booked | 0 General Calls |

FIG. 12

Recap Report

Start Date ☐  End Date ☐  [Apply]

$7,000 — Opportunities Won  1332

$0 — Opportunities Lost  1332

New Patient Opportunities
Total Opportunities  1
Total Booked  1
Total Not Booked  0

Exisiting Patient Opportunities
Total Opportunities  2
Total Booked  2
Total Not Booked  0

Weighted Keywords
Crown Repair Orthodontics
New Patient Exam 1342
1340
1300
1310
1330

FIG. 13

Referral Metrics

Show [10 ▽] Metrics Per Page                    Search: 1402

| 1410 Source | 1420 Total Visits | 1430 Unique Visitors | 1440 Total Calls | 1450 Conversion |
|---|---|---|---|---|
| Search Engine 1 | 3 | 2 | 1 | 50% |
| Direct | 237 | 31 | 3 | 9.7% |
| Search Engine 2 | 72 | 58 | 5 | 8.6% |
| Search Engine 3 | 2 | 2 | 0 | 0% |

Showing 1 to 4 of 4 Metrics                     Previous | Next

FIG. 14

Traffic Keywords and Queries

Start Date [ ] End Date [ ] [Apply] — 1502

Show [10 ▽] Records Per Page    Search: [ ]

| Search Query | Count ↓≡ |
|---|---|
| Query 1 | 2 |
| Query 2 | 1 |
| Query 3 | 1 |
| Query 4 | 1 |
| Query 5 | 1 |
| Query 6 | 1 |

Showing 1 to 6 of 6 Analytic Records    [Previous] [Next]

← 1510

Show [10 ▽] Records Per Page    Search: [ ]

| Keyword | Count ↓≡ |
|---|---|
| Dental | 3 |
| Extraction | 2 |
| Free | 2 |
| Tampa | 2 |
| Wesley | 2 |
| Chapel | 2 |
| FL | 1 |
| Dentist | 1 |
| Crown | 1 |
| Cleaning | 1 |

Showing 1 to 10 of 20 Analytic Records    [Previous] [Next]

INTERACTIVE KEYWORD CLOUD

CROSS-REFERENCE TO RELATED APPLICATIONS

This application is a continuation of U.S. patent application Ser. No. 15/790,442 filed on Oct. 23, 2017, which is a continuation of U.S. patent application Ser. No. 15/377,484 filed on Dec. 13, 2016, which claims the benefit of U.S. Prov. App. No. 62/311,331 filed on Mar. 21, 2016, and U.S. Prov. App. No. 62/368,431 filed on Jul. 29, 2016, where the entire content of each of the foregoing is hereby incorporated by reference.

This application is also related to the following commonly-owned U.S. patent application filed on Dec. 13, 2016 and incorporated herein by reference in its entirety: U.S. patent application Ser. No. 15/377,428 entitled "Call Visualization."

TECHNICAL FIELD

The present disclosure generally relates to techniques for improved handling of inbound telephone calls.

BACKGROUND

Various technologies exist today for operating telephone call centers or otherwise handling inbound business inquiries. However, current tools often fail to timely address at-risk business opportunities, maximize the potential value of client calls, or more generally improve the quality of information delivered during the calls. There remains a need for improved call monitoring and training techniques to support call-based monitoring of a merchant's interaction with a consumer.

SUMMARY

Merchant/consumer calls may be recorded and evaluated according to a variety of criteria. The call recordings and analyses thereof, as well as consumer tracking information, may be displayed in a user interface of a web-based online portal for convenience in evaluating the use and efficacy of marketing channels as well as the quality of merchant/consumer interactions. In an aspect, the user interface provides call visualization in the form of audio data from a telephone call displayed as a waveform on a call timeline. The call may be (automatically or manually) annotated with various business-value-specific keywords spoken during the telephone call, and markers for these keywords can be presented on the call timeline to visually indicate the keyword and the time during the call when the keyword was spoken. A business value for the call may be determined based at least in part on keywords spoken during the call.

In an aspect, a method may include storing audio data for a telephone call, storing an annotation for a keyword, where the keyword is a business-value-specific keyword spoken during the telephone call, and the annotation identifies the keyword and a time during the telephone call when the keyword was spoken. The method may also include displaying the audio data as a waveform on a call timeline in a user interface, where the user interface includes a control for audio playback of the audio data at a user selected time along the call timeline. The method may further include presenting a marker for the annotation within the user interface, the marker visually indicating on the call timeline the keyword and the time during the telephone call when the keyword was spoken, determining a business value for the telephone call based on the keyword, and displaying the business value within the user interface.

Implementations may include one or more of the following features. The business value may include a dollar value for potential services. The business value may include a likelihood of converting a sales opportunity. The method may further include presenting a prospect conversion outcome for the telephone call within the user interface. The method may further include storing a plurality of annotations for a plurality of keywords related to the telephone call, presenting a corresponding plurality of markers, and determining an aggregate business value for all of the plurality of keywords. At least one of the plurality of keywords may be an expected keyword that was expected to be spoken during the telephone call but not detected during a time period within the telephone call. Each of the corresponding plurality of markers may span a portion of the telephone call proximal to one of the plurality of keywords. Each of the corresponding plurality of markers may span a portion of the telephone call proximal to one of the plurality of keywords, where the user interface includes a second control to facilitate user playback of the portion of the telephone call. Each one of the corresponding plurality of markers may be visually coded to illustrate whether a portion of the telephone call proximal to one of the plurality of keywords is negative or positive relative to a likelihood of converting a prospect on the call to becoming a new customer. Each one of the corresponding plurality of markers may be visually coded to illustrate whether a portion of the telephone call proximal to one of the plurality of keywords is negative or positive relative to the business value of the call. The method may further include automatically detecting the keyword within the audio data and generating the annotation. The method may further include manually reviewing the telephone call and creating the annotation. The method may further include detecting the telephone call and placing the telephone call in a call analysis queue for distributions to a call analysis coach. The method may further include notifying the call analysis coach of the telephone call in the call analysis queue. The method may further include presenting a plurality of audio controls within the user interface. The method may further include sending a notification to a user indicating whether a business opportunity was won or lost. The method may further include providing a link to a scorecard of call characteristics for the telephone call. The scorecard may include one or more of a date and time of the telephone call, a duration of the telephone call, a telephone number associated with the telephone call, a location of a party to the telephone call, one or more keywords spoken during the telephone call, one or more call basics representing information expected to be spoken during the telephone call, call scoring of the telephone call, and a financial metric related to the telephone call. The method may further include presenting a listing of telephone calls in the user interface containing a selected keyword. The listing of telephone calls may be visually coded to indicate whether a business opportunity was won or lost.

In an aspect, a computer program product may include computer executable code embodied in a non-transitory computer readable medium that, when executing on one or more computing devices, performs the steps of: storing audio data for a telephone call, and storing an annotation for a keyword, where the keyword is a business-value-specific keyword spoken during the telephone call, and where the annotation identifies the keyword and a time during the telephone call when the keyword was spoken. The code may further perform the step of displaying the audio data as a waveform on a call timeline in a user interface, where the user interface includes a control for audio playback of the audio data at a user selected time along the call timeline, presenting a marker for the annotation within the user interface, the marker visually indicating on the call timeline the keyword and the time during the telephone call when the keyword was spoken, determining a business value for the call based on the keyword, and displaying the business value within the user interface.

In another aspect, a system may include a database storing audio data for a telephone call, along with an annotation for a keyword, where the keyword is a business-value-specific keyword spoken during the telephone call, and where the annotation identifies the keyword and a time during the telephone call when the keyword was spoken. The system may also include a processor configured to determine a business value for the telephone call based on the keyword, and a web server configured to serve a web page including a user interface that displays the audio data as a waveform on a call timeline, where the user interface includes a control for audio playback of the audio data at a user selected time along the call timeline, where the web server is further configured to present a marker for the annotation within the user interface, the marker visually indicating on the call timeline the keyword and the time during the telephone call when the keyword was spoken, and where the web server is further configured to display the business value within the user interface.

Merchant/consumer calls may be recorded and evaluated according to a variety of criteria. The call recordings and analyses thereof, as well as consumer tracking information, may be displayed in a user interface of a web-based online portal for convenience in evaluating the use and efficacy of marketing channels as well as the quality of merchant/consumer interactions. In an aspect, the user interface provides a representation of a variety of telephone calls as an interactive keyword cloud that presents business-value-specific keywords targeted for detection during such telephone calls. The keyword cloud may depict keywords in a range of colors, sizes, and relative positioning to connote varied degrees of significance, such as a relative rate of occurrence of keywords in the represented telephone calls. Each keyword in the keyword cloud may contain a hyperlink to related content such as a listing of telephone calls containing the keyword.

In an aspect, a method may include storing audio data for a plurality of telephone calls, for each one of the telephone calls, storing a plurality of annotations for a plurality of keywords, where each one of the keywords is a business-value-specific keyword spoken during the one of the telephone calls and having a predetermined business value, and where each one of the annotations identifies one of the keywords and a time during the one of the telephone calls when the one of the keywords was spoken, presenting the keywords for all of the plurality of telephone calls in a keyword cloud within a first user interface, where each one of the keywords displayed within the first user interface contains a hyperlink to related content, responding to a selection of the hyperlink for one of the keywords by presenting a second user interface containing a listing of each one of the plurality of telephone calls containing the one of the keywords, the second user interface further containing a call data hyperlink for accessing one of the plurality of telephone calls in the listing, and responding to a second selection of the call data hyperlink by presenting a third user interface that displays the audio data for the one of the plurality of telephone calls as a waveform on a call timeline, the third user interface including a control for audio playback of the audio data at a user selected time along the call timeline, and the third user interface presenting a marker visually indicating on the call timeline the one of the keywords and the time during the one of the plurality of telephone calls when the one of the keywords was spoken.

Implementations may include one or more of the following features. The method may further include presenting a plurality of audio controls within the third user interface for controlling audio playback. The plurality of audio controls may include a first control for replaying an audio segment associated with the one of the keywords. The plurality of audio controls may include a second control for jumping forward to a next annotation within the call timeline. The keyword cloud may include a number of occurrences for each one of the keywords. Each one of the keywords within the keyword cloud may be scaled in size according to a relative frequency of occurrence. Each one of the keywords within the keyword cloud may be scaled in size according to the predetermined business value. Each keyword presented within the keyword cloud may be responsive to a mouse over event by displaying at least one of a heat map of geographic source, a distribution of time of day, or a number of occurrences. Each keyword presented within the keyword cloud may be responsive to a touch screen event by displaying at least one of a heat map of geographic source, a distribution of time of day, or a number of occurrences. The listing of each one of the plurality of telephone calls in the second user interface may be visually coded to indicate whether a business opportunity was won or lost.

In an aspect, a method may include recording a number of telephone calls, annotating the telephone calls to identify occurrences of a number of keywords spoken during the telephone calls, and presenting the keywords within a first user interface as a keyword cloud, where each one of the keywords in the keyword cloud includes a hyperlink configured to navigate a user using the first user interface to a second user interface including a listing of one or more of the telephone calls containing that one of the keywords.

Implementations may include one or more of the following features. Each one of the keywords may be a business-value-specific keyword spoken during the number of telephone calls and having a predetermined business value. Each one of the keywords within the keyword cloud may be scaled in size according to the predetermined business value. The second user interface may further include a call data hyperlink for accessing one of the telephone calls in the listing. The call data hyperlink may navigate the user to a third user interface that presents audio data for the one of the telephone calls as a waveform on a call timeline. The third user interface may include a control for audio playback of the audio data at a user selected time along the call timeline, and the third user interface may present a marker visually indicating on the call timeline the one of the keywords and the time during the one of the number of telephone calls when the one of the keywords was spoken. The keyword cloud may include a number of occurrences for each one of the keywords. Each one of the keywords within the keyword cloud may be scaled in size according to a relative frequency of occurrence. Each one of the keywords within the keyword cloud may be responsive to a mouse over event by displaying at least one of a heat map of geographic source, a distribution of time of day, or a number of occurrences. The listing of one or more of the telephone calls in the second user interface may be visually coded to indicate whether a business opportunity was won or lost.

In an aspect, a computer program product may include computer executable code embodied in a non-transitory computer readable medium that, when executing on one or more computing devices, performs the steps of: storing audio data for a plurality of telephone calls, for each one of the telephone calls, storing a plurality of annotations for a plurality of keywords, where each one of the keywords is a business-value-specific keyword spoken during the one of the telephone calls and having a predetermined business value, and where each one of the annotations identifies one of the keywords and a time during the one of the telephone calls when the one of the keywords was spoken, presenting the keywords for all of the plurality of telephone calls in a keyword cloud within a first user interface, where each one of the keywords displayed within the first user interface contains a hyperlink to related content, responding to a selection of the hyperlink for one of the keywords by presenting a second user interface containing a listing of each one of the plurality of telephone calls containing the one of the keywords, the second user interface further containing a call data hyperlink for accessing one of the plurality of telephone calls in the listing, and responding to a second selection of the call data hyperlink by presenting a third user interface that displays the audio data for the one of the plurality of telephone calls as a waveform on a call timeline, the third user interface including a control for audio playback of the audio data at a user selected time along the call timeline, and the third user interface presenting a marker visually indicating on the call timeline the one of the keywords and the time during the one of the plurality of telephone calls when the one of the keywords was spoken.

In another aspect, a system may include a database storing audio data for a plurality of telephone calls, and for each one of the telephone calls, storing a plurality of annotations for a plurality of keywords, where each one of the keywords is a business-value-specific keyword spoken during the one of the telephone calls and having a predetermined business value, and where each one of the annotations identifies one of the keywords and a time during the one of the telephone calls when the one of the keywords was spoken. The system may also include a web server configured to present the keywords for all of the plurality of telephone calls in a keyword cloud within a first user interface, where each one of the keywords displayed within the first user interface contains a hyperlink to related content, the web server further configured to respond to a selection of the hyperlink for one of the keywords in the first user interface by presenting a second user interface containing a listing of each one of the plurality of telephone calls containing the one of the keywords, the second user interface further containing a call data hyperlink for accessing one of the plurality of telephone calls in the listing, and the web server further configured to respond to a second selection of the call data hyperlink in the second user interface by presenting a third user interface that displays the audio data for the one of the plurality of telephone calls as a waveform on a call timeline, the third user interface including a control for audio playback of the audio data at a user selected time along the call timeline, and the third user interface presenting a marker visually indicating on the call timeline the one of the keywords and the time during the one of the plurality of telephone calls when the one of the keywords was spoken.

BRIEF DESCRIPTION OF THE DRAWINGS

The foregoing and other objects, features and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein.

FIG. 5 shows a scorecard of call characteristics.
FIG. 8 shows a user interface with a call list.
FIG. 11 shows a report for phone number metrics.
FIG. 12 shows a report for staff metrics.
FIG. 13 shows a recap report.
FIG. 14 shows a report including referral metrics.
FIG. 15 shows a report including traffic keywords and queries.

DETAILED DESCRIPTION

Figure 1:
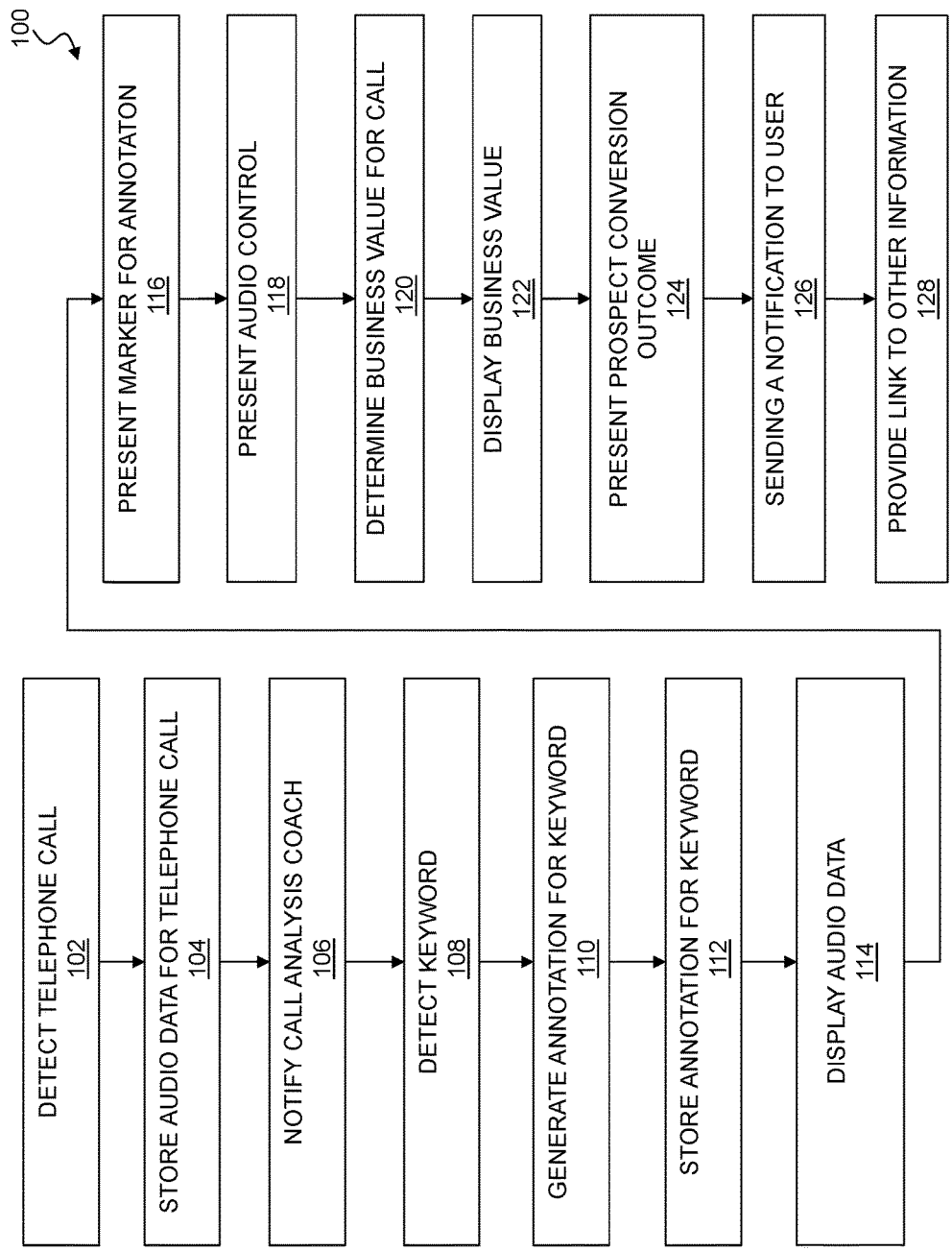
FIG. 1 is a flow chart of a method for call visualization.

The embodiments will now be described more fully hereinafter with reference to the accompanying figures, in which preferred embodiments are shown. The foregoing may, however, be embodied in many different forms and should not be construed as limited to the illustrated embodiments set forth herein. Rather, these illustrated embodiments are provided so that this disclosure will convey the scope to those skilled in the art.

All documents mentioned herein are incorporated by reference in their entirety. References to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the embodiments.

In the following description, it is understood that terms such as "first," "second," "top," "bottom," "up," "down," and the like, are words of convenience and are not to be construed as limiting terms unless specifically stated to the contrary.

Described herein are devices, systems, and methods for call visualization as well as the generation and use of an interactive keyword cloud for telephone calls. These techniques may be applied to the field of consumer activity tracking and analysis, and more particularly, and may be adapted for analyzing Internet browsing and call activity of consumers who place telephone calls to a business, or consumers who receive telephone calls from a business. The techniques and systems described herein provide a convenient platform for evaluating how telephone calls are handled, e.g., for coaching to improve future client interactions and for timely following up on lost opportunities having a high potential business value.

Service professionals who rely on phone contact with prospective clients to develop new sources of income may look to combine phone contact with online and social media promotion to increase the average value gained from phone calls to their practice. Because a call made to a business's office (e.g., dentist, therapist, healthcare provider, roofer, electrician, seller of good, and nearly any other business or service professional) has the potential to turn into a new client, businesses may view such calls as an essential aspect of daily business that deserves attention in order to improve quality, performance, and general value to the business. Additionally, ready and actionable access to information derived from such calls, which may be integrated with business workflows, may further enhance the ability of businesses to benefit from these basic technology building blocks.

Techniques described herein may be particularly useful for service providers, such as dentists, therapists, healthcare providers, roofers, plumbers, electricians, and other professionals, tradespeople, and so forth. While the following description emphasizes use in a dental context (where an in-house our outsourced call center is common), the techniques and systems described herein may be applicable to a plurality of businesses and industries, and the present examples are provided for only convenience and are not intended to be limiting in scope.

Before calling a merchant, consumers commonly obtain the merchant's telephone number from one of a number of marketing media channels, such as the merchant's website, a radio advertisement, a print advertisement, and the like. In particular, the use of Internet-based marketing media, such as websites and pay-per-click advertisements has proliferated as consumers increasingly turn to the Internet before any other source to find out more information about a business.

A consumer's activities and viewing of marketing media can be tracked by assigning a different telephone number to each marketing channel or advertisement. If a consumer calls a certain telephone number to reach the merchant, it can be assumed that the customer viewed the associated marketing media before calling. This does not, however, typically permit merchants to track individual consumer Internet activities as each consumer calling a given telephone number is generally treated the same. Instead, individual consumer Internet activities can be tracked by assigning a unique telephone number to each consumer that views a merchant's website or other Internet-based marketing media. But this may have the disadvantage of becoming expensive and inefficient as the call volume to a merchant increases causing merchants to purchase additional telephone numbers.

Disclosed herein are systems and methods for tracking consumer activities, including marketing media viewed by a consumer, Internet browsing activities of a consumer, and consumer calls to a merchant. To this end, various marketing media or channels may be assigned different "parent" telephone numbers that consumers call to reach a merchant. If a call is received using a given parent telephone number, it is assumed that the consumer viewed marketing media associated with that parent number. One or more "child" telephone numbers are associated with the parent number. When a consumer accesses a merchant's website, the website may display a child telephone number that is associated with the consumer visiting the merchant's webpage, thereby permitting the individual consumer's activities to be tracked.

A system may record data relating to a consumer's Internet activities, including, but not limited to: information concerning the "referral source" that the consumer used to arrive at the merchant's website, such as a pay-per-click advertisement or from an Internet search or directory listing; and the individual pages of a merchant's website accessed by the consumer as well as the date and time such pages were accessed. When a consumer calls a merchant, the call may be recorded, evaluated, and associated with data relating to the consumer's Internet activities. The consumer call and Internet activity data may be used to generate various reports and alerts that a merchant or other third-party can use to evaluate the efficacy of a merchant's marketing efforts as well as the quality of a merchant's telephonic interaction with consumers.

As used herein, the term "merchant" may generally describe an individual or entity that markets goods or services, e.g., through network-based channels, and that may utilize the systems and methods of immersive call visualization and interactive keyword clouds described herein to track and analyze incoming telephone calls. A "consumer" may be an individual or entity that seeks to purchase or does purchase goods or services from a merchant. The term consumer may be used interchangeably with the terms customer, client, lead, prospect, and the like. A "communications provider" may generally denote a communications service that provisions and de-provisions telephone numbers, records telephone calls, and facilitates the forwarding of incoming telephone calls, among other functions.

The term "tracking system" may generally refer to a system that tracks incoming consumer telephone calls to a merchant and associates data related to the calls with data related to consumer responses to marketing, such as consumer Internet browsing activities. A tracking system may also or instead provide software platforms that permit users to view and analyze data gathered from tracking consumer calls and other activities. A tracking system can be maintained by a merchant or an external, third-party service provider. The term "referral service" may generally describe a third-party providing network-based marketing content that directs consumers to a merchant through, for instance, a popup or banner advertisement, a sponsored Universal Resource Locator (URL) link, a directory listing, or a search results listing. Examples of referral services include, but are not limited to, Internet search engines (e.g., GOOGLE®, YAHOO!®, or BING®), social media platforms (e.g., FACEBOOK®, LINKEDIN®, TWITTER®, or INSTAGRAM®), or any other third-party website that displays banner advertisements, sponsored links, or other similar marketing content.

In addition to evaluating the efficacy of various marketing media to determine which media consumers are using most often and how, as well as which media yields the highest conversion rates of calls and sales, after a consumer calls a merchant, specific merchant interactions with the consumer may be usefully monitored so that merchant representatives can be properly trained. Accordingly, systems and methods described herein allow merchants to track consumer activities by attributing incoming consumer calls to particular marketing channels while also efficiently tracking individual consumer Internet activities prior to initiating a call. The systems and methods may further allow merchants to record and evaluate incoming telephone calls and associate this information with consumer tracking information and/or business outcomes. The merchant can thus gather a comprehensive picture of a consumer's experience up until a sale is made (or not), including, for instance, the marketing channels a consumer viewed, Internet searches performed, pages of a merchant website viewed, and the customer's telephonic interaction with the merchant.

Immersive call visualization tools will now be described.

Call visualization may solve many of the technical challenges that prevent merchants from gaining benefits from basic call routing and monitoring technologies. By combining advancements in digital presentation technology, as may be expressed through digital sources such as the Internet via web pages, social media, email, and others, with computer-enabled tools for call recording, analysis, business workflow integration, audio call content-based real-time alerts, and the like, immersive call visualization may provide significant improvements in business value derived from commonplace telephone calls, as well as the ability to identify whether and where favorable and unfavorable interactions are occurring.

In embodiments, immersive call visualization may include one or more computer implemented tools that enable annotating of a telephone conversation between a client (or prospective client) and a merchant representative. Immersive call visualization may facilitate such annotation using variably weighted business-centric markers that represent an aspect specific to a business value for a business party associated with the call. The annotations may indicate portions of the call (e.g., portions of a digital representation of the telephone conference, such as a digital recording of the call), based on an indication of the relevance of the words spoken by the prospective client and/or the merchant representative to value-derivable keywords associated with the business. Other aspects of the telephone conversation, such as a tone or mood of a call participant (consumer or merchant representative) may also or instead be annotated in a similar manner. Such annotations may also or instead indicate various states of the call, such as a state related to one or more of the detected or omitted keywords, perceived tone, caller mood, and the like.

FIG. 1 is a flow chart of a method for call visualization. In general, the method 100 may include recording a telephone call, analyzing the telephone call for the presence or absence of business-value-specific keywords spoken during the call (e.g., using automated techniques, manual techniques, or a combination thereof), and providing tools for users to further analyze the telephone call. The method 100 may further include determining and presenting a business value for the telephone call based on the aforementioned analyses. In this manner, the method 100 may include a technique for call visualization that enables a user (such as a merchant, service provider, and the like) to receive and view a value associated with a telephone call based on business-value-specific keywords spoken during the call, or the lack of a presence of such keywords. By showing such a business value associated with a call to a user, techniques may provide the user with an opportunity to follow-up on calls, e.g., calls that resulted in lost opportunities having a high potential for business value. The method 100 may also or instead be used for training purposes, e.g., for training employees that make or field such telephone calls. The method 100 may also or instead be used for analytics, e.g., analytics used to determine the effectiveness of call techniques, call personnel, marketing, advertising, and the like.

As shown in step 102, the method 100 may include detecting a telephone call such as a business call relating to the business of a merchant or the like. The telephone call may be an incoming call received by a user, e.g., at the user's place of business, call center, or the like. As discussed herein, the "user" may refer to a merchant, call coach, call center employee or other similar user of the disclosed platform. The incoming call may originate from a consumer as described herein.

The telephone call may be identified in part based on a telephone number used by the consumer to place the call. The telephone call may also or instead be identified based on a consumer's caller identification (caller-ID) or other information originating from the consumer. In another aspect, a website or other source that provides a dynamic calling number may be associated with the call based on information (e.g. from a website log) about a machine, IP address, or the like that the dynamic phone number was served to. This web information may be further supplemented by any information provided by the consumer during a web site visit, e.g., where the consumer has submitted information or requested information through a website, a registry, or the like. Such information may have also or instead been otherwise extracted from the consumer, e.g., through any available metadata, explicitly self-reported data or the like.

The telephone call may be an outgoing call placed by a merchant to a consumer, e.g., a customer of the merchant or a potential customer of the merchant. In an aspect, all outgoing calls from a merchant are detected as telephone calls. In an aspect, the calls are filtered, e.g., to separate business calls from non-business calls. Filtering may include screening calls based on codes entered before placing a call—e.g., a merchant representative may dial '123' before all business calls and dial '456' before all personal calls. Certain phone lines may also or instead be associated with business calls or non-business calls.

Business calls, whether incoming to a merchant or outgoing from a merchant, may also or instead be detected based on words spoken during the call by one or more parties on the call. This may occur through an automated analysis or a manual analysis of the call.

As shown in step 104, the method 100 may include storing audio data for a telephone call. The audio data may be stored in a database that provides storage for one or more of call recordings, call records, voice recordings, merchant data, consumer tracking data, and the like. The audio data may be stored in any suitable compressed or raw binary form, according to the storage capabilities and streaming requirements for the intended use. In general, substantial compression may be available where, for example, the spoken content of the audio data is more important than perfect acoustic reproduction. The database may be maintained by a merchant, or by a third-party that provides call recording services for the merchant. For example, in an aspect, when a consumer places a call to a merchant, or when a merchant places a call to a consumer (e.g., an existing client or a potential client), a call handler may route and record the telephone call as a raw call into a database for recording and storage thereof. In implementations, the call handler is a third-party call service that routes and records such telephone calls, where call analysis proceeds separate from the recording of telephone calls. In other implementations, call routing and recording is part of a single call analysis system. In an aspect, redundant mass storage for audio data may be maintained using a cloud storage provider or the like.

As shown in step 106, the method 100 may include notifying a call analysis coach of the telephone call in the call analysis queue. Once a telephone call is detected and audio data is stored, the telephone call may be transmitted to a call analysis coach, or placed in a call analysis queue for distribution to a call analysis coach. The call analysis coach may include a manual reviewer of the telephone call. The call analysis coach may, e.g., include a technician or other suitably trained personnel to provide a review and analysis of the telephone call. The review may include a substantive analysis of the content of the telephone call, including the identification of one or more keywords spoken during the telephone call or the absence of such keywords from the telephone call. The coach may manually annotate the call by identifying, within an audio timeline, where a word or combination of words was spoken, and identifying what word(s) were spoken. In this manner, the review may include a substantially objective review. The call analysis coach may also or instead provide subjective feedback when reviewing a call, such as one or more comments regarding the keywords or lack thereof, suggested improvements for the merchant's representative who spoke with the consumer on the telephone call, and the like.

In an aspect, the review of the telephone call may be automated. Thus, in this context, the call analysis coach of the method 100 may include an automated review system, e.g., that performs further steps of the method 100 such as keyword detection, annotations, business value generation, and so forth.

As shown in step 108, the method 100 may include detecting one or more keywords in the telephone call. A keyword may include a business-value-specific keyword spoken during the telephone call.

As discussed herein, the keywords may be manually detected and extracted, automatically detected and extracted, or some combination of these. A variety of speech recognition techniques are known in the art, and may be suitably adapted for detection of keywords within an audio file as contemplated herein. In one aspect, a speech recognition model may be specifically trained to detect keywords relevant to a particular business. For example, in a dental call center, a speech recognition model may be trained for improved recognition of names of dental procedures, dental businesses, dental products, and so forth. In one aspect, an automated speech recognition platform may provide a confidence score, which can include a statistical confidence that a keyword has been accurately identified. Such a confidence score may be used, for example, to weight subsequent scoring of a potential commercial opportunity, a business value, and the like. Such a confidence score may also or instead be used to determine when a manual review for keyword identification is required or recommended. In another aspect, keyword identification may be manually performed. Thus, in aspects, the keyword may be manually detected, e.g., by a call analysis coach that listens to the stored telephone call and manually annotates passages within the telephone call according to detected keywords. Thus the method 100 may generally include automatically detecting keywords within audio data for calls, manually detecting keywords within audio data for calls, or some combination of these.

The keywords may generally be associated with expected business value. This may, for example, include information pertaining to a business value associated with a presence of a particular keyword in a call, a lack of presence of a keyword, a keyword appearing in an expected location or an unexpected location in the call, and the like. The expectations for, and value of, a particular keyword may depend, for example, on default values or a history of prior calls. This expectation value may be algorithmically and automatically adjusted from time to time based on a range of factors, including among others a presence of certain other keywords in the call. Expectation values may be applied to a call grading algorithm to facilitate the generation of an overall call grade based on a plurality of call qualities.

As shown in step 110, the method 100 may include generating an annotation for the keyword. The annotation may identify the keyword and a time (which may be a specific point in time, or an interval including the spoken keyword) during the telephone call when the keyword was spoken. The annotation may thus be used to identify moment(s) when a keyword was spoken. Once annotated in this manner, a hyperlink or other indication (pop out, note, message, etc.) or combinations of the foregoing, may be provided at a corresponding location within a display of the call timeline so that a reviewer can directly identify where the keyword occurred and link to further information, or listen to a contextual audio playback, or otherwise interact with the relevant information about the annotation.

The annotation may also or instead include comments associated with the keyword. For example, in a telephone call associated with a dental practice, the keyword "insurance" may be annotated with a comment that includes the patient's insurance provider. The comments may thus include objective information. Similarly, in a telephone call associated with a dental practice, the keyword "cleaning" may be used, where a representative of the dental practice failed to mention that the practice is offering a coupon for such services; in this example, a comment may note this failure to mention the coupon. The comments may also or instead include subjective information provided by a call analysis coach or the like. For example, a keyword associated with a greeting may be detected, but a call analysis coach may observe that the merchant representative did not have a friendly tone or cadence, and may thus include a comment directed to this observation.

The annotation may also or instead include relevant metadata such as whether the keyword was used by the caller or by a representative that received the call. In another aspect, e.g., where keyword identification is automatically performed, each keyword may be tagged with an annotation including a statistical confidence that the keyword has been accurately identified. In one aspect, a user may enter arbitrary keywords. In another aspect, a fixed collection of keywords, e.g., for a particular business or industry, may be provided for selection and use by a call reviewer. In another aspect, keyword annotation may automatically normalize keywords, e.g., to a synonym, a relevant product, or any other singular proxy for a collection of different keywords with equivalent semantic or commercial significance.

As discussed above, the annotation may be generated manually, e.g., by a call analysis coach that listens to the stored telephone call. Thus, the method 100 may include manually reviewing the telephone call and creating the annotation.

The annotation may also or instead be generated automatically, e.g., by the same or similar software that detects the keyword within the audio data. For example, techniques may utilize computer-assisted functions, including routing a call to a computer automated call content digitization facility for recording and mapping a call so that keywords and other call content can be parsed and annotated. Techniques may also or instead include the use of one or more of automated speech recognition, audio keyword detection, crowd sourcing of human analysis of the call, and the like.

As shown in step 112, the method 100 may include storing the annotation for the keyword. The annotation for the keyword may be stored with the audio data for a telephone call, e.g., in a metadata layer, companion file, or the like such that a user accessing the audio data for a telephone call in a user interface of a computing device can view and access the annotations. In an aspect, the annotations are editable by a user, e.g., a call analysis coach or another user.

As shown in step 114, the method 100 may include displaying the audio data. This may include displaying the audio data in any suitable form. For example, displaying the audio data as a waveform on a call timeline in a user interface provides a useful, intuitive representation of time-based audio data. However, this may more generally include any visual representation of the call audio recording that might suitably be presented within a user interface. For example, the audio data may be shown as a waveform along a horizontal axis representative of time. The waveform may graphically depict a call based on, e.g., audio energy or content over time, with time represented along an x-axis (e.g., a horizontal axis) and the audio energy depicted as a dependent variable on the y-axis (e.g., a vertical axis). The horizontal axis may be labelled with time stamps that correspond to the duration of the call as well as additional labels at the location of keywords or other content of interest.

The user interface may include one or more controls. For example, the user interface may include a control for audio playback of the audio data. This control may permit point-and-click audio playback or other tools so that a user can initiate audio playback at a user-selected time along the call timeline. Various other audio player functions may also or instead be provided that allow a user to play, pause, rewind, advance or otherwise control call playback. The audio player may include a visual indicator (e.g., a vertical line) that moves horizontally across a time axis of the call timeline to indicate a current playback position.

As shown in step 116, the method 100 may include presenting a marker for the annotation within the user interface. The marker may display a keyword, and visually indicate on the call timeline the time during the telephone call when the keyword was spoken. The marker may include shading, coloring, labeling, one or more icons, and the like in order to indicate business value, content, relevance, or any other useful information. In an aspect, and as explained below, a feature of the marker (e.g., coloring or the like) may indicate to a user a characteristic of the annotation or keyword associated therewith. For example, negative comments from a call analysis coach may be represented by red markers, while positive comments may be represented by green markers. The term "annotation" is generally used herein to refer to data associated with a keyword event, while "marker" is generally used to refer to the style and content of a display of the annotation. Thus an annotation may be captured automatically or by a call coach, and a corresponding marker may be displayed within a user interface. While this convention is generally followed herein, it will be noted that the term annotation may, in certain instances be used to refer more generally to the data and/or presentation of the data, and all such meanings are intended to fall within the scope of the term "annotation" as used herein, unless a different meaning is expressly stated or otherwise clear from the context.

As shown in step 118, the method 100 may include presenting an audio control for controlling audio playback of a telephone call or a portion thereof. This may include one or more audio controls such as any of the controls described above, or any other control or combination of controls known in the art and/or suitable for controlling playback of call audio within a user interface as contemplated herein.

As shown in step 120, the method 100 may include determining a business value for the telephone call. This may, for example, be based on the keyword(s) identified in the call, and any other related information or context. Each call made to a merchant, or call made from a merchant to a customer or potential customer, may represent an opportunity to gain new business, such as by enrolling a new client, scheduling a new patient, providing new or additional services to an existing client, and so forth. In order to usefully determine the business value for a call, the content of the call may be analyzed, e.g., by analyzing the interactions between the caller (such as a potential new patient) and the merchant's representative, identifying keywords related to business value, and so forth.

In one aspect, the business value may be determined in a post-processing step. In another aspect, the business value may be determined in near-real time, such as were relevant keywords are automatically detected and evaluated in the background during a call. In either case, efforts may be made to potentially recover a related business opportunity, such as by providing feedback to a merchant representative during the call, or by creating an alert for a prompt follow up call by another representative or a professional who may be in a better position to describe any procedures or other services of interest. Suitable alerts may be a report of a business-specific value of a call that has not been converted to a merchant so that a prompt follow-up may be scheduled. In another aspect, a suitable alert may be a communication to a merchant representative who handled the call concerning the missed opportunity, along with coaching tips or the like where available. The alert may also include actionable information (e.g., call summaries, metadata, keywords, automatic redial, and the like) where this information is available, which may, for example, be communicated directly to a computer or mobile device for a merchant for an immediate determination of whether additional steps should be taken.

The business value may include a monetary value for potential services, such as anticipated revenue, profit, losses, insurance payments, co-pays, third-party payments, industry standard values, insurance adjustments, and the like. In general, the business-specific value may be determined based on the presence or absence of specific keywords as described herein. The business value may also depend on other factors. For example, a default business-specific value for a keyword may be adjusted based on one or more of content of a call, a source channel of the caller, a demographic of the caller, a credit rating of the caller, an insurance provider of the caller, and the like. Furthermore, while a default business-specific value for a keyword may be determined from data sources associated with a particular business (e.g., a business service fee sheet), a business value may also or instead be determined or adjusted based on a range of other factors, including without limitation market rates for services, insurance policy limits, monetary exchange rates, interest rates, prior payments received for comparable services/products, competitor advertised pricing, initial client discounted pricing, discount coupon-based pricing, and the like.

By way of non-limiting example, a call from a caller who has followed on-line resources (e.g., uniform resource locator (URL) links) from a particular insurance company for a particular dental or medical service may have a default business-specific value that is adjusted based on an expected payout from the particular insurance company. In another example, a call from a caller whose demographics suggest that the caller is located in a low-cost region or a high-cost region may have an expected payout that is adjusted accordingly. Likewise, if a caller's credit report suggests payment over time may provide a greater chance of the caller becoming a client of the service provider, an expected value for this specific caller for one or more prospective services may be adjusted to factor in payment over time.

The business value may also or instead include a likelihood of converting a sales opportunity. This business value may therefore represent a future revenue prospect for a client. Thus, for example, where a potential customer calls to discuss a specific procedure, additional business value may accrue where that potential customer is a new customer that is expected to yield future business for a practice. This additional business value may be gained or lost according to whether the specific, originally-requested procedure was booked.

While keyword-based valuation is specifically contemplated, it will be understood that other techniques for assigning a business value to a call may also or instead be employed. In general, the business value may be based on a human analysis of the call, an automated analysis of the call, or a combination thereof. Implementations may use automated speech recognition, audio keyword detection, machine learning, manual review, and any other suitable techniques, or combinations of these, to automatically determine an aggregate business-specific value opportunity (and whether the opportunity was won or lost) for a call. Manual techniques such as manual review or crowd-sourced review may also or instead be used.

In addition to automating a business-specific valuation of calls, such computer-implemented algorithms may automate generation of a call-back data structure that includes without limitation one or more of call-specific content, keywords spoken in a call, keywords that are not spoken but perhaps should have been part of a conversation (e.g., based on a relationship of the unspoken keyword to a portion of the call content), the caller, a call back number, a keyword of significance to use in the call-back call, and the like. This data structure may automatically be delivered to a merchant's computing device, such as a smart phone or the like in order to facilitate immediate response by a relevant professional or other personnel. This data structure may further include or provide timely access to other computer automated functions, such as auto-dialing, email generation, text messaging, audio prompting (e.g., audio prompting that is audible to only a merchant's representative making the call such as through the representative's loud speaker or head set), and the like.

In regards to correlating a business-specific value to an audio call, business-specific values may be assigned to certain words, phrases, interactions, and the like (all of which are intended to be covered herein by use of the term "keyword" unless stated to the contrary or otherwise clear from the text) that may be detectable through recording and analyzing audio data of a call. Automation of some or all of these steps, including determining an aggregate value of the detectable keywords within an audio call may be performed by a computer system configured to digitally record and store an audio call, perform keyword detection as contemplated herein, and assign a business-specific value for at least a portion of the call. Some or all of the steps used to correlate an audio call to a business-specific value may be performed by one computer or more than one computer. For example, some of the steps may be performed by a first computer and other steps may be performed by other computers that may be connected via one or more networks to the first computer.

As shown in step 122, the method 100 may include displaying the business value for a call within the user interface. The business value may be displayed as a monetary amount, one or more symbols or graphics, or otherwise. This information may, for example, be displayed along with the audio timeline, or in a separate user interface, and may be accompanies by a more detailed breakdown of positive and negative contributors to the aggregated business value for a call.

As shown in step 124, the method 100 may include presenting a prospect conversion outcome for the telephone call within the user interface. The prospect conversion outcome may be displayed as a binary "won" or "lost." The prospect conversion outcome may also or instead be displayed as a percentage of converting a prospect into a customer. Other representations are also or instead possible including symbols or graphics, scores, rankings, colors, and so forth.

The method 100 may be used for a plurality of keywords. To this end, the method 100 may include storing a plurality of annotations for a plurality of keywords related to the telephone call, presenting a corresponding plurality of markers, and determining an aggregate business value for all of the plurality of keywords. Each of the corresponding plurality of markers may span a portion of the telephone call proximal to one of the plurality of keywords, e.g., in a call timeline where the audio data is displayed as a waveform or the like. Each marker may be visually coded to illustrate whether a portion of the telephone call proximal to one of the plurality of keywords has a negative or positive business value based on, e.g., a relative likelihood of converting a prospect on the call to becoming a new customer. The user interface may include one or more controls to facilitate user playback of a portion of the telephone call proximal to one of the plurality of keywords, e.g., separate from or the same as the audio controls described above.

In an aspect, at least one of the plurality of keywords is an expected keyword, i.e., a keyword that was expected to be spoken during the telephone call but was not detected during a time period within the telephone call.

The method 100 may include presenting a listing of telephone calls that contain the keyword, e.g., within the user interface for the audio timeline or an independent user interface. The listing of telephone calls may be visually coded to indicate whether a business opportunity was won or lost. For example, when viewing the audio data for a telephone call, a user may select a keyword that is annotated within that call, where such a selection triggers the presentation of a list of other telephone calls that include the same (or similar) selected keyword. The list may be included in the same user interface as the audio data, or a separate user interface. For example, each keyword may be hyperlinked to provide a listing of calls that contain that keyword.

As shown in step 126, the method 100 may include sending a notification or alert to a user, e.g., indicating whether a business opportunity was won or lost. For example, the detection of calls that represent a lost business opportunity may include flagging such calls for notification. In an aspect, automated value threshold detectors may assist with human screening and dispositioning of calls, such as by highlighting candidate keywords for human review. For automated call coaching, calls that exceed an urgent notification threshold may be automatically escalated for resolution, call-back, follow-up or the like by a business representative. Such calls may be placed in a high priority call-back queue that is transmitted (e.g., sent via push notification or the like to a user's computing device) to a business representative relatively soon following such a call. In this manner, a well-informed business representative may initiate a call-back to a prospect within minutes of a telephone call ending. Alerts or notifications may also or instead be sent for other reasons. For example, an alert may be sent to a manager or the like if a call received during normal business hours for a merchant went to voicemail instead of being answered by a merchant representative.

Timely response to potential new customers or clients can result in improved conversion of prospects into actual customers or clients of a merchant. Therefore, facilitating a timely response (e.g., calling back a prospective client quickly) can leverage automated call analysis capabilities described herein by ensuring prompt, human response where appropriate. Merely determining that a lost business opportunity exceeds a call-back threshold may be useful in some instances; however, this can be an inefficient technique that does not yield many new customers or clients. But by combining data gathering, call content analysis, business-specific valued keyword detection, and other features related to call management techniques described herein, comprehensive callback context may be configured and delivered to a merchant representative in a manner that facilitates appropriate action by the merchant. This callback context may be embodied as an interactive data structure, such as a webpage with a graphical user interface, which may be readily displayed and interacted through a commonplace web browser on a user's computing device (e.g., a mobile computing device). Such an interactive data structure may include basic information, such as the name of the prospect. The interactive data structure may also or instead include advanced information, such as information about a prospect's Internet browsing history, a target set of keywords to address during the call back, pricing to offer, and the like. This contextual information may be derived and/or extracted from a digital recording of an original call from the prospect to the merchant. Therefore, methods and systems may include automatically generating a call-specific alert, automatically issuing the alert with an interactive alert-specific data structure, and facilitating automation of functions to initiate the call and increase effectiveness of the call (e.g., redialing, pop-up electronic interface, context based on near real-time analysis of speech on the return call, etc.), and the like.

As shown in step 128, the method 100 may include providing a link to other information, e.g., information regarding the telephone call. This may include a scorecard or the like, e.g., a scorecard of call characteristics for the telephone call. The scorecard may, e.g., be similar to that described below with reference to FIG. 5, and may include one or more of a date and time of the telephone call, a duration of the telephone call, a telephone number associated with the telephone call, a location of a party to the telephone call, one or more keywords spoken during the telephone call, one or more call basics representing information expected to be spoken during the telephone call, results of call scoring of the telephone call by a call coach, and a financial metric related to the telephone call.

As discussed above, various methods and systems described herein may be fully automated or partially automated, such as the detecting a telephone call, detecting keywords, generating annotations, presenting markers, determining business values, and so forth. To this end, the various methods and systems described herein may utilize automated speech recognition, automated mood detection from speech, and the like. Through automated correlation of a business-specific value with detected keywords, a business value of a call may be automatically generated in near real time. Through automated detection of mood, particularly changes in mood of a prospective customer or client during a call, automating prompts for a representative of the merchant on the call to respond to a mood change may be provided accordingly. Mood analysis may also or instead be developed into an indication of the likelihood of a prospective customer becoming a new customer. Such a near real-time indication may be provide a helpful guide for a merchant representative to encourage or facilitate a mood change associated with a positive business outcome, or to redirect the conversation if a mood change is associated with a negative business outcome. Other uses for automated mood detection may include providing further insight for a merchant regarding an annotated call, or for more generally assessing the business value of a call. For example, mood analysis may be used in an algorithm that provides a score or rating for portions of a call. As an example, if a caller's mood becomes increasingly positive during a call, the call may receive a higher rating (with a higher business value) than if the caller's mood becomes increasingly negative during the call. Each change in mood detected during the call may also or instead be automatically marked to be readily accessible to a person reviewing a recording of the marked call.

The automation of techniques such as keyword detection, mood analysis, and business-specific value may be helpful by reducing workloads of coaches who review such calls for a merchant. As an example, a threshold of potential business value won/lost may be set so that only calls above a predetermined threshold are directed to a coach for manual review. This may reduce time spent on calls that are unrelated to new or existing clients, such as calls to confirm existing appointments, requests for directions, misdialed or wrong numbers, and so forth.

Automation can improve computer performance and reduce the demand for computing resources. As an example, calls that do not meet a predetermined business-value threshold may be temporarily stored, moved to a secondary memory storage, consolidated, and reduced in size (such as by deleting some of the call content), saving only metadata associated with the call (e.g., including keywords and the like). In a hosted embodiment, which may include tens of thousands of businesses/merchants and many millions of calls, reducing data storage demands and further computer processing of calls may improve the performance of a computer hosting solution. A real consequence of such improvement may be a reduction in the number of hosted servers required for data storage and processing.

Techniques and systems described herein may be configured for specific businesses, merchants, users, and the like. For example, to determine the business-specific value for keywords that are used in the call valuation process, a predetermined set of information for a merchant may be used to specifically tailor the valuation to the merchant and its business. Likewise, changes to certain business services of the merchant (e.g., a fee increase, new services being offered, and the like) may be factored into a system's configuration. Other sources of service value data may be considered as well, such as insurance-based payments for services, contracts with third parties (e.g., private pay companies, discount providers such as GROUPON®, and the like), comparable service charges for competing businesses, local, regional, or national service fees and trends, anticipated value for services not yet offered, capital depreciation for equipment that is either service-specific or has limited functionality, and the like.

As described herein, techniques and systems of immersive call visualization may provide various presentation tools, user interfaces, alerts, digital communications and notifications, and the like that can include, implement, display, or otherwise feature the call gathering, digitizing, annotating, valuing, variably weighted marking, and grading techniques and systems described herein. Such immersive call visualization presentation capabilities may include presenting an interactive, computer generated and controlled, representation of a call that is annotated with keyword-value related markers in a graphical user interface. Interactive aspects of such a digital presentation may facilitate access to detailed data associated with a keyword-value related marker and the like. Interactive aspects may further facilitate direct access to specific segments of a call that are digitally represented so as to permit single-click (or the like) playback of at least a portion of a specific segment or playback of one or more segments. These and other interactive features of such an electronic presentation (e.g., a digital dashboard) may provide access to multi-modal interaction time lines covering online and telephone contact, call opportunity values, and the like. Other interactive aspects of such user interfaces may include interactive three-dimensional charts (e.g., pie charts), background three-dimensional call-related graphing, pushing content to a service provider, digital call recovery alerts, and the like.

Such dashboards or user interfaces may be digitally communicated to one or more users (e.g., designated representatives of a merchant) on a predetermined periodic basis, such as daily, hourly, and the like, or otherwise may be provided on an on-demand basis, or provided through a notification transmitted, e.g., because of one or more conditional occurrences. Because such a dashboard can facilitate relatively easy access to underlying call content, caller demographics, caller specifics (e.g., insurance coverage), and the like, a user may perform dashboard type actions directly from a portable computing device, e.g., a smart phone, a tablet device, a laptop device, and the like (e.g., a computing device that supports commonplace web browser capabilities).

According to the foregoing, in one aspect there is disclosed herein a system comprising a database, a processor, and a web server. The database may store audio data for a telephone call, along with an annotation for a keyword, where the keyword is a business-value-specific keyword spoken during the telephone call, the annotation identifying the keyword and a time during the telephone call when the keyword was spoken. The processor may be configured to determine a business value for the telephone call based on the keyword. The web server may be configured by computer executable code embodied in a non-transitory computer readable medium to serve a web page including a user interface that displays the audio data as a waveform on a call timeline, where the user interface includes a control for audio playback of the audio data at a user selected time along the call timeline, where the web server is further configured to present a marker for the annotation within the user interface, the marker visually indicating on the call timeline the keyword and the time during the telephone call when the keyword was spoken, and where the web server is further configured to display the business value within the user interface.

Figure 2:
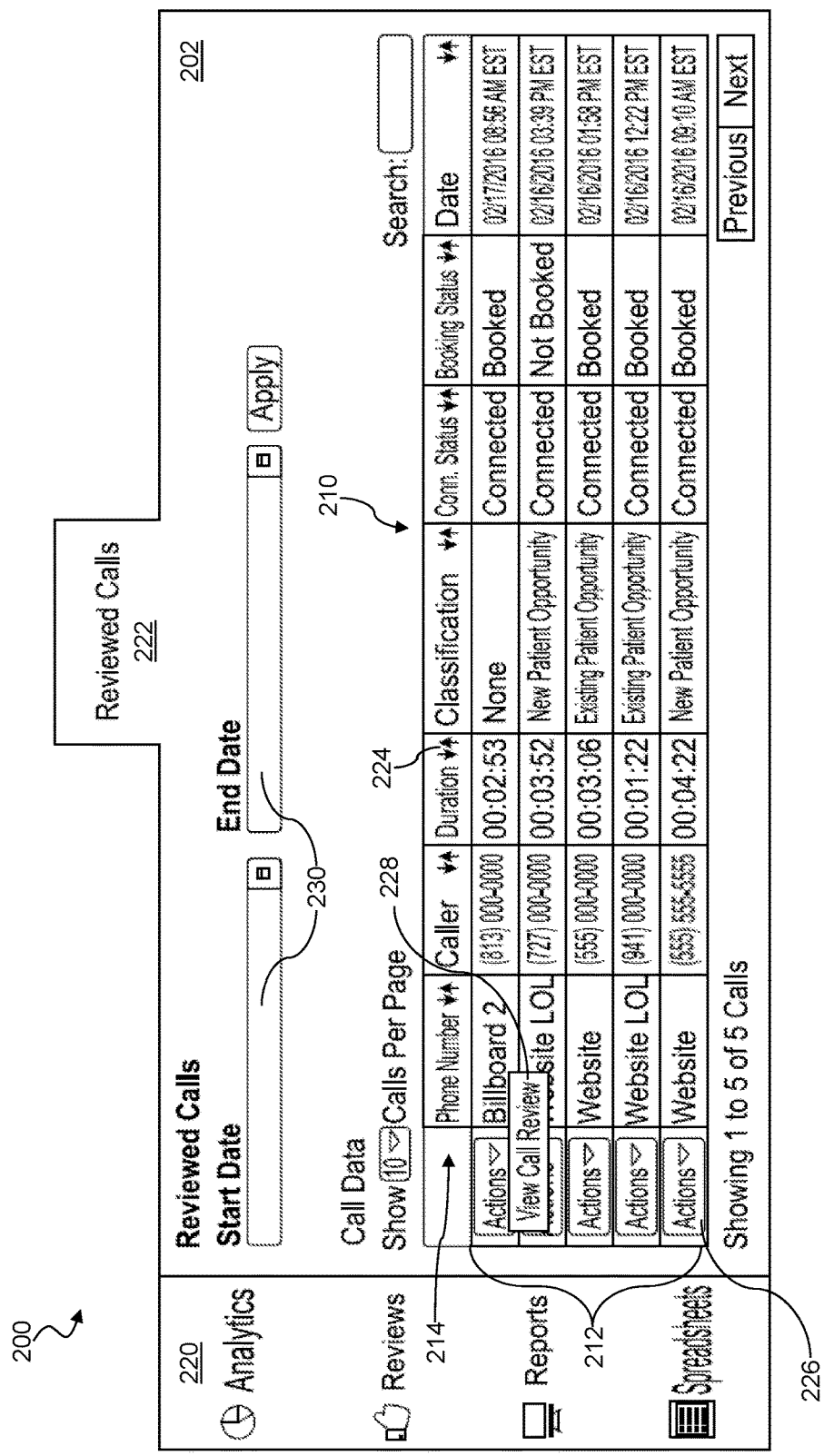
FIG. 2 shows a user interface with a call listing.

FIG. 2 shows a user interface with a call listing. As shown in the figure, the user interface 200 may include a listing 210 of one or more calls 212. The calls 212 may include telephone calls made or received over a predetermined date range. For example, using the user interface 200, a user may pull up a list of incoming calls to a merchant over a given date range such as that shown in the figure by selecting a review function 222 or the like from a variety of functions 220 presented in the display 202 of the user interface 200.

By way of example, the listing 210 of calls 212 in the figure shows incoming calls over a particular date range that are displayed by selecting or entering dates in date fields 230 (e.g., entering dates in the 'Start Date' and 'End Date' text boxes and selecting the 'Apply' function as shown in the figure). The listing 210 of calls 212 may include one or more columns showing call properties 214, including without limitation one or more of a parent telephone number identifier, an originating telephone number, a call duration, a call classification, a connection status, a booking status, a date and time a call was made, and the like. The listing 210 of calls 212 may be sorted according to the call properties 214, e.g., by selecting a corresponding sort function 224 or the like, which is shown as a set of parallel, vertically aligned arrows in the column headings in the figure.

One of the calls 212 may be selected by a user for further review. For example, a user may click on one of the calls 212 (or an actions drop down menu 226 associated with a call 212 as shown in the figure, which may yield a number of options including an option to select a call review function 228 permitting the user to review details for a particular call). Selecting a call 212 for further review may access specific call review data for that call 212. For example, selecting the call review function 228 may display another user interface, e.g., the user interface shown in FIG. 3.

Figure 3:
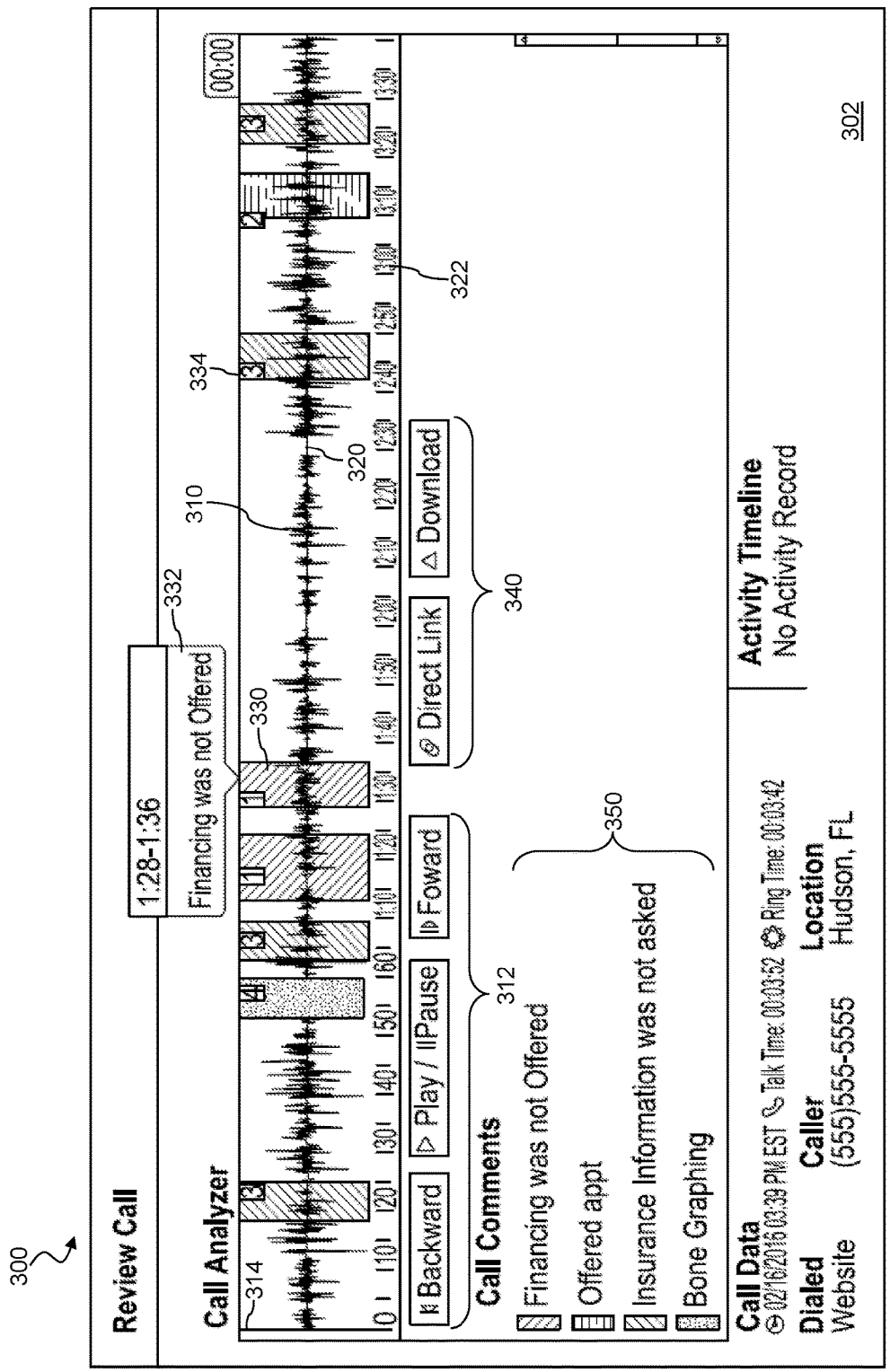
FIG. 3 shows a user interface with call visualization.

FIG. 3 shows a user interface with call visualization. In general, the user interface 300 may include a display 302 for reviewing a recorded call. The user interface 300 may include a visual representation of a call audio recording (e.g., audio data for a telephone call). Specifically, as shown in the figure, the audio data may be presented as a waveform 310 on a call visualization timeline 320.

The user interface 300 may include one or more controls 312 for controlling audio playback of the waveform 310. This may include controls that allow a user to play, pause, rewind, advance and the like. The waveform 310 may be displayed with a visual indicator 314 (e.g., a vertical line or the like) that moves horizontally across the call visualization timeline 320 to indicate a current playback position. The audio player use any suitable technology platform, audio codecs, and the like to play the recording.

The call visualization timeline 320 may be disposed along an axis (e.g., a horizontal axis for time) having one or more time stamps 322 demarcating the passage of time during a call.

The user interface 300 may include any number of supplemental controls 340 or functions (e.g., a second control in addition to the controls 312 shown in the figure). For example, supplemental controls 340 may include a URL link to the audio file or a menu item for downloading a local copy of the audio file to a user's computing device.

Where call coaching is to be performed, the user interface 300 may permit a user to graphically overlay markers 330 (e.g., indicators for text-based comments or annotations 332) over specific time ranges of the call visualization timeline 320, where the markers 330 are shown as shaded regions over the waveform 310 in the figure. A user may create a marker 330 by clicking on the waveform 310, dragging a cursor over a given range of time, and typing the desired annotation 332 in a resulting popup text box. The marker 330 can be graphically resized or moved, e.g., to change a start time or end time. The content of an annotation 332 or comment included in a marker 330 may be presented during a mouse over of a marker 330, resulting in a display a popup or the like containing the comment text, start time, end time, and/or other pertinent information. Similarly, when a user clicks on a marker 330 or otherwise selects a marker 330, audio associated with the marker may be played. The marker 330 may be stored in any suitable manner and associated with a specific time or a time interval of the audio. For example, when the marker 330 is created by a user, a corresponding database entry may be created that associates the annotation 332 with the audio file and waveform 310. In an aspect, the marker 330 and annotation 332 are provided by a call analysis coach or the like for viewing by another merchant representative such as a manager, an employee who places such telephone calls, and the like.

Annotations 332 may be visually assigned to categories by color coding the markers 330 and/or by assigning the annotations 332 a value 334 corresponding to a grade or score, e.g., an alphabetic or numeric grade. The color coding and grading may be customizable to represent a variety of conditions and criteria. For instance, a marker 330 can be shaded green to represent a positive comment or shaded red to represent a negative comment. The annotations 332 may also or instead be assigned a grade, e.g., from one to five or A to E, to indicate the degree to which a comment or annotation 332 is positive or negative (for example, where a score of five indicates a very positive or negative comment and a score of one indicates a slightly positive or negative comment). Alternatively, in another aspect, discussions about a merchant's goods or services may be represented with another color, e.g., a blue marker or a grade of "A," while discussions about financing are represented with yet another color, e.g., a green marker or a grade of "B." In general, the grades or scores may be any suitable quantitative representation including, e.g., a numerical value over some predetermined scale. The user interface 300 may also display the annotations 332 in a listing 350 or the like, e.g., where the listing 350 includes the color indicator. Selecting an annotation 332 from the listing 350 may play audio associated with the start and end times of the marker 330. The value 334 assigned to an annotation 332 may instead represent a particular type of comment, condition, keyword, tone, or other criteria.

Figure 4:
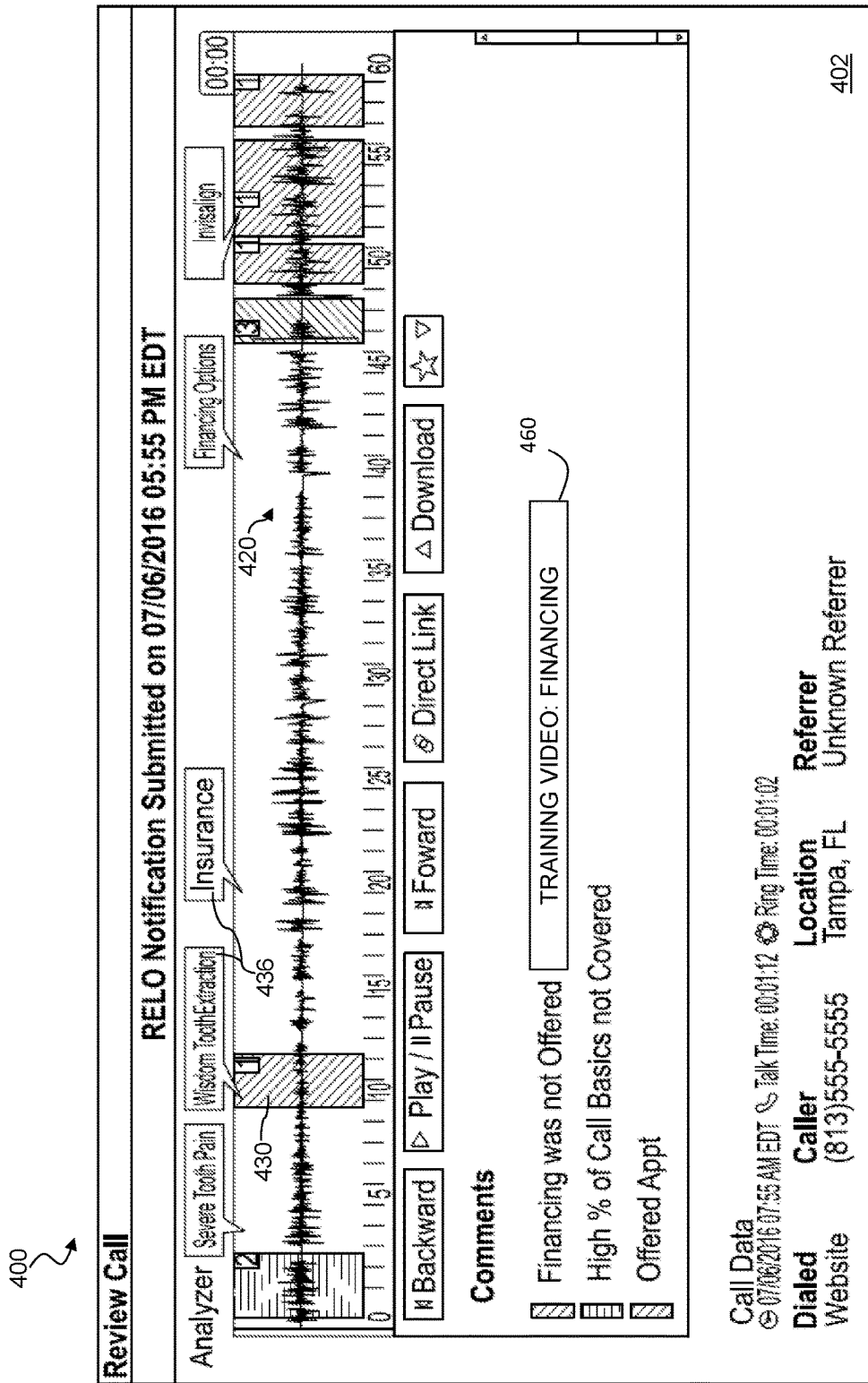
FIG. 4 shows a user interface with call visualization.

FIG. 4 shows a user interface with call visualization. The user interface 400 may, for example, show an audio timeline for a particular call. As generally, described herein, the user interface 400 may include a display 402 showing a call audio recording represented by a waveform 410 on a call visualization timeline 420. The display 402 may also include various call visualization features such as one or more keywords 436 occurring during a call, along with related visual content.

As described above, the call may be annotated with positive or negative events, e.g., based on a predetermined scorecard of call characteristics such as those depicted in FIG. 5. For example, a call may begin with a merchant representative asking for a caller's name. If this occurs during the call, then that portion of the call may be highlighted along the call timeline with a marker 430 that is favorable, e.g., a color code such as green. If this question is not asked during the beginning of the call, then a time when the question should have been asked may be highlighted along the call timeline with a marker 430 that is negative, e.g., a color code such as red. In one aspect, a call may be manually scored by a call coach, technician, or other suitably trained personnel, and the corresponding annotations and scoring may be stored along with other data for the call. In another aspect, some aspects of call scoring and evaluation may be automated, e.g., using speech recognition and other processing techniques to recognize speech, extract words and semantic meaning, and so forth. In another aspect, other signal processing, machine learning, artificial intelligence, or the like may be used to automatically extract mood, tone, and other characteristics of a call that might be relevant to call scoring. One of ordinary skill in the art will appreciate that the effectiveness of various techniques for automated audio processing may depend on the nature of the information sought. Thus, while one of ordinary skill in the art will appreciate that while existing commercial and/or open source programming tools exist for extracting information such as keywords 436 and tone using (e.g., CMU Sphinx, Julius, and Kaldi), these tools may be unable to reliably recover all useful scoring metrics in all circumstances. As such, various combinations of manual and automated scoring may be appropriate according to the metrics being scored, the quality of the audio, the processing resources available for scoring, and so forth. In one aspect, certain scoring metrics may be automated and others may be manual. In another aspect, some or all of the scoring metrics may initially be attempted automatically, and an objective function may be employed to estimate the quality of automated scoring and request manual intervention as needed.

Once positive and negative scoring events have been identified and associated with the call visualization timeline 420, these events may be displayed in any suitable fashion using markers 430, e.g., highlighting, call-outs, color coding, and so forth. The markers 430 may be hyperlinked to relevant background descriptive information, or these markers 430 may be graphically hyperlinked within the display 402 to corresponding segmented audio so that relevant audio portions of the call can be immediately accessed for audio review. The call visualization timeline 420 and waveform 410 may also or instead be annotated with one or more keywords 436 relevant to call scoring or to the evaluation of a relative business value of a call. In either case, the call visualization timeline 420 may be manually or automatically tagged at the moment(s) when a keyword 436 was spoken, and hyperlinked to a corresponding location within the timeline for audio review. The keywords 436 may also or instead be visually displayed in callouts or the like for visual review of a call.

The user interface 400 may include one or more links 460 to training materials such as videos, written or audio tutorials, and so forth. Thus, a user interface 400 displaying a call timeline 420 such as any of those described herein may include interactive access to relevant training materials. Training materials may be specifically tailored to certain scoring metrics so that relevant material can be presented, via a link 460 such as a hyperlink or the like, within the context of a call timeline 420 at a relevant moment within a call. Thus, for example, when a negative score is attributed with a portion of a call, various coaching materials may be provided to address one or more causes of the negative score and one or more potential solutions. This may include any suitable training materials. For example, this may include video training materials, audio training materials, written training materials, and the like, as well as interactive training materials to provide suitable drills and the like. This may also or instead include testing materials to ensure that training materials have been reviewed and that the relevant information has been learned by a trainee or other participant reviewing the materials.

In one aspect, training materials may be progressive. For example, where an operator or other call center technician receives a negative score for a specific reason, relatively simple and brief commentary may be provided as an initial learning guide or reminder. If the same negative attribute is detected again on a subsequent call for that same operator or technician, or for numerous calls over a period of time, then more extensive training materials may be presented. The training materials may also escalate from optional to mandatory according to a change, or lack thereof, in behavior by a call center professional. While training materials may be usefully linked to a particular location within a call timeline 420, these materials may also or instead be presented in other contexts such as an overall scorecard for a call or other user interface. In another aspect, training materials may be proactively distributed to trainees, such as by transmitting an electronic mail communication or other message to a call center professional for review at a later time.

In an aspect, gamification of the training materials may be provided. For example, a platform may provide gamification where a user earns points or the like for performing certain actions (e.g., response-based or accessed-based actions) where the points can earn the user a reward.

FIG. 5 shows a scorecard of call characteristics. The scorecard 500 may in general include various information pertaining to a telephone call. The call may be realized in an interactive user interface, e.g., for use by a call coach in evaluating a call, or for subsequent display on a user interface. For example, the scorecard 500 may include call data 510, where the user interface also accepts user inputs or automatically generated inputs analyzing a telephone call for display on the scorecard 500, such as call basics 520, call analysis 530, call scoring 540, and financial metrics 550 as shown in the figure. Content of the scorecard 500 may be particular to whether the call is an outgoing call from a merchant to a consumer (e.g., where a purpose of the call is known) or whether the call is an incoming call to the merchant from a consumer (e.g., where a purpose of the call is initially unknown).

The call data 510 displayed on the scorecard 500 may include characteristics of a telephone call such as the date and time the telephone call was placed or received, the duration of the call, a ring time (i.e., how long before the call was answered), the originating telephone number, the target telephone number (e.g., dialed by a consumer or merchant), a location of a party on the call, and so forth.

The scorecard 500 may include one or more keywords 536 as described herein, e.g., keywords 536 spoken during the call or keywords 536 that should have been spoken during the call. The keywords 536 may include markers that indicate whether the keywords 536 were used in a manner consistent with best practices for such telephone calls.

As discussed herein, audio data associated with the telephone call may be analyzed according to customizable evaluation criteria that can be specified by a merchant. The evaluation criteria may include binary inputs, quantitative scoring, qualitative descriptions, discrete categorization, and the like.

The scorecard 500 may include call basics 520 representing basic information that is expected to be spoken/discussed during a telephone call. Such basic information may include without limitation one or more of announcing the name of the merchant's representative, asking for the consumer's name and basic information, offering a consultation, offering an appointment, announcing appointment times, asking about insurance information, asking about a status of a consumer (e.g., the consumer's health or comfort level if the merchant is in the medical/dental field, or the status of a good or service owned/used by the consumer), offering financing, asking about how a consumer heard about a merchant, and so forth. The call basics 520 section of a scorecard 500 may include indications about whether the call basics 520 were covered during the call, e.g., through checkmarks or x's as shown in the figure.

The call analysis 530 may include specific information pertaining to the call. For example, the call analysis 530 may include without limitation one or more of a connection status (and/or a reason for not being connected), who was on the call (e.g., who answered the call), a classification (e.g., a new patient opportunity in an example where the merchant is in the medical/dental field), benefits information (e.g., insurance information where the merchant is in the medical/dental field), a booking status (and/or a reason for not being booked), notes, a referring source, bibliographic or demographic information for the consumer, and so forth.

The call scoring 540 may include scoring for predetermined categories, e.g., automatically generated or generated by the merchant for its particular business. For example, the call scoring 540 may include grades or scores for one or more of a greeting, an engagement, booking information, etiquette, and the like.

The scorecard 500 may include financial metrics 550, e.g., concerning an amount of income generated by a particular call (labeled as "Opportunities Won/Lost" in the figure) or an amount of income that could have been generated if a consumer had committed to purchasing goods or services during the call (labeled as "Opportunities Lost" in the figure). This information may be manually created after evaluation of the call, or this information may be automatically created based on call keywords and other aspects of call analysis and scoring.

The scorecard 500 may identify the call coach or reviewer that inputted certain information used in the scorecard 500. The scorecard 500 may also or instead identify the merchant's representative that was on the call with a consumer.

The process of analyzing audio data can be better understood with reference to a simplified example where a potential new or existing patient (i.e., the consumer) calls a dental practice (i.e., the merchant) to inquire about booking an appointment. In this example, an audio recording of the telephone call may be played and evaluated according to certain criteria representing information or subject matter that should typically be addressed by dental practice personnel during an incoming call, such as: (1) the name of the dental practice representative answering the call; (2) the patient name; (3) available appointment times; (4) the patient's insurer, if any; (5) financing options; (6) the price of a consultation; (7) whether the patient is experiencing any present discomfort; and (8) for potential new patients, how the patient became aware of the dental practice. An evaluator, reviewer, or call analysis coach listening to the audio recording may select a radio button, checkbox, pull down menu, or other suitable binary input to indicate whether or not the subject matter was addressed during the call. The results of the analysis may be accessed in a user interface featuring the scorecard 500 shown in the figure or similar synopsis, where a checkmark indicates that the subject matter was addressed, and an "x" indicates that it was not addressed.

Audio data can also or instead be analyzed using qualitative descriptions or discrete categorization. An incoming call to a dental practice can be categorized, for example, according to criteria such as whether: (1) the caller was a potential new patient, an existing patient, or a general caller (e.g., a telemarketer, a patient asking about the practice location, etc.); (2) the caller is covered by insurance; (3) the incoming call was connected or sent to voicemail; (4) the reason a call was not connected (e.g., call made after business hours, practice telephone lines were busy, etc.); or (5) the caller booked an appointment or not. The analysis may also or instead include entry of qualitative descriptions on criteria such as: (1) the name of the individual conducting the analysis; (2) the practice representative's name; (3) the caller's name; (4) the referral source (e.g., a friend or family member, a billboard advertisement, a website, etc.); and (5) a description of why a caller did not book an appointment, if applicable (e.g., price too high, practice did not offer the requested service, etc.). The audio data may be associated with one or more keywords 536, such as "new patient" or "wisdom tooth extraction" as shown in the figure, that may briefly describe the substance of the call, e.g., for use in searching and sorting call records.

The audio data may be further analyzed by entering a numeric score or grade (e.g., between one and four as shown in the figure) in categories such as those displayed in FIG. 5: (1) the quality of the greeting; (2) whether the representative adequately engaged the patient; (3) whether the patient booked an appointment; and (4) the practice representative's phone etiquette. Comments or annotations may be graphically entered, graded, scored, color coded, and associated with specified time durations of the audio data as described herein. To illustrate the process of annotating a comment, a representative may provide a quote for the requested service during the call, offer financing, and confirm that a practice accepts a patient's insurance plan. But the representative might neglect to quote a price for the requested services after applying insurance coverage. A comment may be associated with the discussion stating "financing offered, but no price given with insurance." The marking for this comment may be color coded as "green" to indicate that the discussion was overall positive, but the comment may receive a grade such as three out of five to reflect the fact that a quote was not provided after applying insurance coverage.

The amount of income generated (or lost) by the call may be determined based on the price of the services that the patient inquired about or requested, among other data. By way of example, a pricing schedule for dental practices services offered may be stored to a database on a tracking server or the like along with other information relevant to determining income gained or lost by a potential booking. The type of service requested may be entered as part of the evaluation process, and the pricing schedule may be used to determine the amount of income generated or lost by a call. So, for example, if the average revenue from a new patient is $2,000, and a new patient books a wisdom tooth extraction costing $2,500, then an amount of $4,500 may be shown in the call review display screen as a "won" opportunity. Thus, implementations may include the use of a pricing schedule or the like for the determination of business values.

Call visualization techniques and systems described herein may utilize a keyword cloud. Using, for example, the techniques and systems described herein, individual call content may be represented with an annotated digitized representation of a call in an electronic user interface. Likewise individual calls may be represented as a business-specific value. Other ways of representing individual calls are described herein. Generation and use of call summary and cumulative data, such as numbers of calls, call rates, call types, and the like are also described herein. However, it may further be beneficial to represent call content in an aggregated display that facilitates actionable discovery of significant call content themes and the like. Such a representation may be useful for discovering trends, tendencies, changes in call characteristics over time, new areas of potential business focus, new service offering suggestions, and the like. Therefore, representing a plurality of telephone calls as a call content cloud may provide substantial benefits. Call content in this context may include the use of business-value specific keywords that are automatically or manually detectable in a telephone call. In particular, a plurality of telephone calls may be represented as a call keyword cloud.

Techniques and systems described herein may therefore facilitate the generation of a keyword cloud from a plurality of telephone calls (e.g., to/from a merchant, such as a service or healthcare business from/to prospective clients). Data items represented in such a keyword cloud may be business-specific keywords that are targeted for detection in calls to/from a merchant. A call content keyword cloud may depict keywords in a range of colors, sizes, labels, and relative positioning to connote varied degrees of significance, such as a relative rate of occurrence of keywords in the represented telephone calls, a business value associated with keywords, and the like. Keywords that are targeted but rarely detected may be included in such a keyword cloud with attributes that connote, for example, diminished or lack of detection. There is a wide range of possible ways to configure keyword elements in such a cloud to depict various conditions. In an example, keywords that are associated with a business-specific value that is above a threshold may be depicted with a size of the keyword in the cloud representing a relative number of times the keyword is detected in a plurality of calls. In another example, a cumulative value for detected keywords (e.g., value multiplied by occurrence) may be used as a basis for determining a relative size of a keyword. In this manner, a lower value keyword that appears frequently could be represented by a keyword that is relatively bigger than a higher value keyword that is rarely detected in calls. In one aspect, multiple visualization tools may be used concurrently. For example, brightness or color may be used to represent aggregate commercial value of occurrences of a keyword, while size may be used to represent number of occurrences of the keyword, or vice versa.

The entire generation and presentation of call content as a keyword cloud may be automated, e.g., starting with automated phone number generation, automated keyword detection using speech detection or similar, multi-call keyword aggregation (e.g., counts of keywords), and the like.

Other uses for keyword clouds that represent telephone calls between humans (a prospective client and a merchant representative) may include generating suggestions for new business offerings and comparing business-specific keyword activity to competitors, where these uses may be applied regionally, nationally, demographically, and the like. Data from sources such as GOOGLE® analytics, YAHOO® analytics, the American Dental Association (ADA), Gartner group, and the like may be integrated with the techniques and systems described herein to further enhance the value of data collected. Generation of keyword clouds and suggestions, comparisons, and the like integrated with third-party data may be fully automated using the techniques and systems described herein. As an example of generating suggestions for a new business offering in the dental field, algorithms may determine from a call keyword cloud that rates of occurrence of keywords related to crown repair in calls for the specific business may be far below the regional average. By changing an advertising model and availability of equipment and personnel to provide a same-day crown repair service, the relative number of calls for crown repair may substantively increase for the business.

Figure 6:
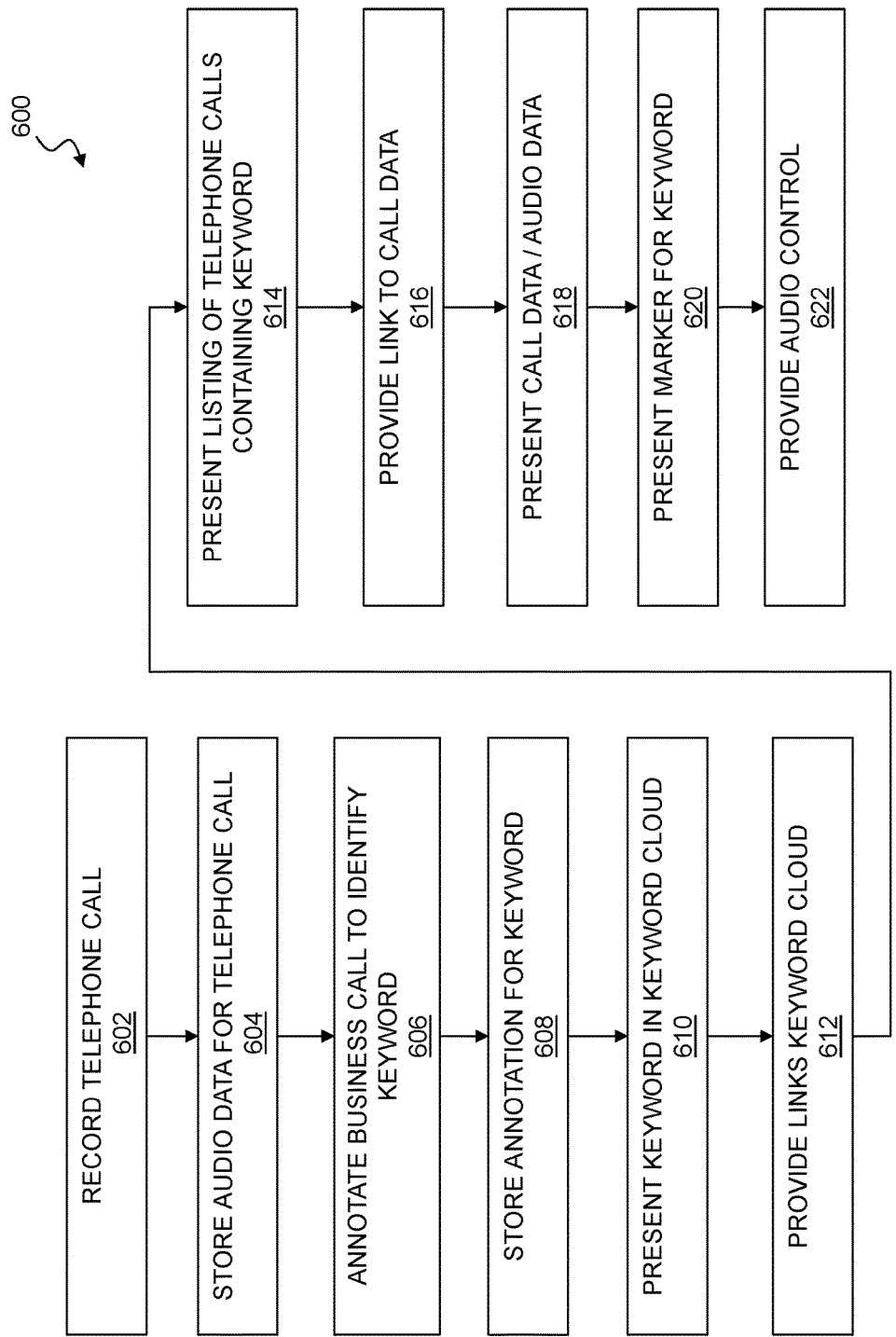
FIG. 6 is a flow chart of a method for generating, presenting, and using a keyword cloud.

FIG. 6 is a flow chart of a method for generating, presenting, and using a keyword cloud. With a collection of calls annotated for the occurrence of keywords, the keywords themselves may be organized across the collection of calls for display, review, analysis, and so forth. In an aspect, a keyword cloud may be created and displayed to graphically represent a corpus of keywords for a collection of telephone calls. This keyword cloud may be usefully hyperlinked to information about the keywords, e.g., in the same user interface or a different user interface. In general, the size of each keyword in the cloud may be varied according to frequency of occurrence, aggregate business value, individual business value, or any other useful metric. Similarly, a number of occurrences or some other label, score, or the like may be displayed within the keyword cloud along with each corresponding keyword to provide additional information.

As shown in step 602, the method 600 may include recording a number of telephone calls, as more generally described herein.

As shown in step 604, the method 600 may include storing audio data for a plurality of telephone calls, e.g., the number of telephone calls recorded in step 602, as more generally described herein.

As shown in step 606, the method 600 may include annotating the telephone calls to identify occurrences of a number of keywords spoken during the telephone calls, as more generally described herein.

As shown in step 608, the method 600 may include, for each one of the telephone calls, storing a plurality of annotations for a plurality of keywords, e.g., the number of keywords identified in step 606. Each one of the keywords may include a business-value-specific keyword spoken during the telephone call and having a predetermined business value. Further, each one of the annotations may identify one of the keywords and a time during a telephone call when the keyword was spoken.

As shown in step 610, the method 600 may include presenting the keywords for all of the plurality of telephone calls in a keyword cloud. The keyword cloud may be presented in a first user interface, where the keyword cloud is interactive as described herein. The keyword cloud may display a number of occurrences for each one of the keywords, e.g., by presenting the corresponding number adjacent to a keyword. This may, for example, be visible continuously and represented in parentheses or the like adjacent to the corresponding keyword, or this may be selectively displayed in response to a user interaction such as a mouse over of the keyword. Additionally or alternatively, each one of the keywords within the keyword cloud may be scaled in size according to a relative frequency of occurrence, or color coded according to the frequency of occurrence, or otherwise visually coded to represent frequency. Each one of the keywords within the keyword cloud may also or instead be scaled in size according to the predetermined business value, or a combination of frequency of occurrence, business value, and/or any useful metric.

The keyword cloud may be an interactive keyword cloud, e.g., through the inclusion of hyperlinks or the like that interactively relate each keyword to other content and/or user interfaces. The keyword cloud may also or instead be interactively responsive to a user through mouse over events or the like. For example, each keyword presented within the keyword cloud may be responsive to a mouse over event of a user by displaying additional information such as, e.g. a heat map of geographic source, a distribution of time of day, a number of occurrences, and the like. Each keyword presented within the keyword cloud may also or instead be responsive to a touch screen event by displaying one or more of a heat map of geographic source, a distribution of time of day, a number of occurrences, and the like. The touch screen event may be utilized in a pressure sensitive display of a computing device, e.g., where the touch screen event include a user pressing a keyword with enough force to display such content, but not enough force to correspond with a clicking event or selection of the keyword.

As shown in step 612, the method 600 may include providing a link to related content in the keyword cloud. For example, each one of the keywords displayed within the first user interface may contain a hyperlink to related content in a separate user interface, such as any of the call visualization interfaces described herein. More generally, each keyword in the keyword cloud may be interactively coupled to listings of related calls or other content to facilitate user drill down or exploration of underlying data.

As shown in step 614, the method 600 may include presenting a second user interface that contains a listing of telephone calls (such as the listing shown in FIG. 2) containing the keyword, e.g., in response to a selection of the keyword in the keyword cloud by a user. Thus, an aspect may include responding to a selection of a hyperlink for one of the keywords in the keyword cloud on a first user interface by presenting a second user interface containing a listing of each one of the plurality of telephone calls containing the keyword. The listing of each one of the plurality of telephone calls (e.g., in the second user interface) may be visually coded to indicate whether a business opportunity was won or lost, or otherwise visually coded to convey other useful information.

As shown in step 616, the method 600 may include providing a link from one of the call listings in the second user interface to individual call data, which may be usefully presented, e.g., using any of the user interfaces and display formats described herein. Thus, an aspect may include providing a second user interface containing call listings that are hyperlinked to individual call data. Each hyperlink may facilitate navigation to a third user interface that presents audio data for the selected telephone call as a waveform on a call timeline, for example using any of the interface and display formats contemplated herein.

As shown in step 618, the method 600 may include presenting call data for a selected telephone call in a third user interface, e.g., in response to a selection of one of the individual call listings presented in the second user interface. Thus, an aspect may include providing a third user interface that includes an audio waveform on a call timeline for a particular telephone call, along with related data, audio controls, and the like as generally described herein.

As shown in step 620, the method 600 may include presenting a marker in the third user interface visually displaying the keyword on the call timeline and indicating the time during the telephone call when the keyword was spoken, e.g., using an arrow or other pointer or the like on the call timeline within the third user interface.

As shown in step 622, the method 600 may include providing a control within the third user interface for audio playback of the audio data represented in the call timeline. This step 622 may also or instead include presenting a plurality of controls within the third user interface, e.g., for controlling different playback functions or supporting other user control options. The audio controls may include, e.g., one or more of a first control for replaying an audio segment associated with a keyword and a second control for jumping forward to a next annotation within the call timeline.

According to the foregoing, in one aspect, there is disclosed herein a system comprising a database and a web server. The database may store audio data for a plurality of telephone calls, and for each one of the telephone calls, a plurality of annotations for a plurality of keywords, where each one of the keywords is a business-value-specific keyword spoken during the one of the telephone calls and having a predetermined business value, and where each one of the annotations identifies one of the keywords and a time during the one of the telephone calls when the one of the keywords was spoken. The web server may be configured by computer executable code embodied in a non-transitory computer readable medium to present the keywords for all of the plurality of telephone calls in a keyword cloud within a first user interface, where each one of the keywords displayed within the first user interface contains a hyperlink to related content. The web server may be further configured to respond to a selection of the hyperlink for one of the keywords in the first user interface by presenting a second user interface containing a listing of each one of the plurality of telephone calls containing the one of the keywords, the second user interface further containing a call data hyperlink for accessing one of the plurality of telephone calls in the listing. The web server may be still further configured to respond to a second selection of the call data hyperlink in the second user interface by presenting a third user interface that displays the audio data for the one of the plurality of telephone calls as a waveform on a call timeline, the third user interface including a control for audio playback of the audio data at a user selected time along the call timeline, and the third user interface presenting a marker visually indicating on the call timeline the one of the keywords and the time during the one of the plurality of telephone calls when the one of the keywords was spoken.

Figure 7:
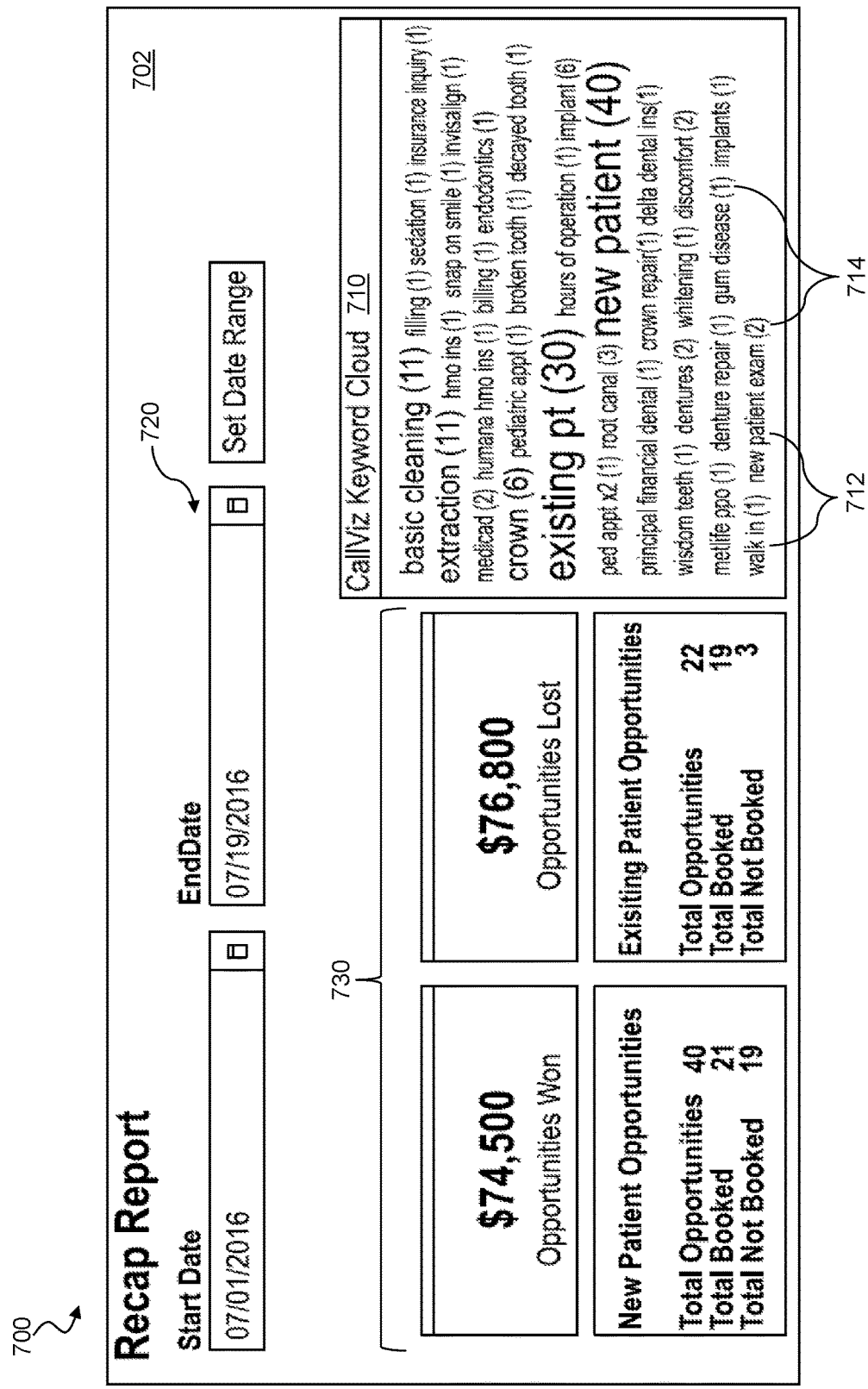
FIG. 7 shows a user interface with an interactive keyword cloud.

FIG. 7 shows a user interface with an interactive keyword cloud. As shown in the figure, the user interface 700 may include a display having a keyword cloud 710, parameters 720 for creation of the keyword cloud 710, and business-value information 730 for calls associated with the keyword cloud 710.

The keyword cloud 710 may include a corpus of keywords 712 for a call collection, where the call collection may be determined by parameters 720 set by a user. The parameters 720 may include a date range as shown in the figure. The parameters 720 may also or instead include location information, merchant information, representative information (e.g., based on a particular representative that makes or fields telephone calls), consumer information, and so forth. More generally, the parameters 720 may include any information, filters, parameters or the like that a user might employ to constrain the call collection used to generate the keyword cloud.

As discussed herein, the size of each keyword 712 in the keyword cloud 710 may be varied according to frequency of occurrence, a business value, or any other useful metric or combination thereof. Similarly, a number of occurrences 714 or some other label, score, or the like may be displayed within the keyword cloud 712 along with each corresponding keyword 712. Each keyword may be further visually coded in a number of ways using, e.g., color, brightness, font, emphasis and the like to convey further information about business value, relevance, frequency, and so forth.

Each keyword 712 in the keyword cloud 710 may be hyperlinked to additional information. As noted above, each keyword 712 may be linked to a call listing for telephone calls that include the keyword 712. However, other information may also or instead be provided through hyperlinks or the like. For example, each keyword 712 may be linked to statistical information such as a frequency of occurrences, number of occurrences, and other statistical information for the keyword 712 such as an average, a mean, a range, quantiles, and any other statistical data for various time periods such as per day, week, month, quarter, year, and so forth. This may also or instead include comparative statistics, such as the corresponding frequency of keywords 712 for other commercial entities in the same general business as a particular merchant. Each keyword 712 may also or instead be hyperlinked to commercial information such as an expected business value associated with each keyword 712. Thus, for example, where a potential customer calls about an automotive repair, the keyword for that repair (e.g., "front windshield replacement") may be attributed with the gross or net economic value of that automotive repair. In another aspect, the keywords may be hyperlinked to a call listing such as that shown in FIG. 8. Where multiple links exist to different types of information, a user-triggered event (such as a mouse hover event or similar action over a keyword or touchscreen) may produce a drop down menu for a user to select the desired information from among a list of choices.

The business-value information 730 may include financial information for a call collection. By way of example, the business-value information 730 may include a total business value of opportunities won and opportunities lost as shown in the figure. This business-value information 730 may include may include details such as a breakdown of new versus existing customers, patients, clients, and the like, where the breakdown may further include a total number of opportunities, a number of opportunities booked, and a number of opportunities not booked.

FIG. 8 shows a user interface with a call list. In general, when a user selects a keyword, e.g., in an interactive keyword cloud or some other user interface feature or location, the user may be presented with a user interface 800 including a listing 810 of calls 812 containing that keyword.

Within the listing 810, corresponding information for the calls 812 may be presented including without limitation one or more of time, duration, classification, booking status, caller ID, source, and so forth. In the context of a dental or medical practice, classification may, for example, indicate whether a call is associated with an existing patient, a new patient opportunity, or some other specific or general purpose. The booking status may indicate explicitly whether a new patient opportunity was booked or not booked, which may be particularly useful for determining an amount of economic opportunity that was won or lost over time. This listing 810 may provide links to additional call information such as call timelines for individual calls, other call statistics, or the like.

In general, the techniques and systems for call visualization and the use of an interactive keyword cloud can assist a merchant in zeroing in on call characteristics that generate revenue for a business and call characteristics that do not generate revenue (or lose revenue through lost business opportunities). Thus, techniques and systems can impact marketing, personnel decisions, service or product offerings, pricing, and so forth. For example, a user may access a web-based portal supports call visualization and interactive keyword clouds as generally described herein, where the user can access individual call audio in order to listen to a telephone call of interest, or a portion thereof, e.g., portions discussing one or more keywords. In this manner, the user can determine why a telephone call was effective or ineffective. Other tools may also or instead be provided as discussed herein to assist in such a determination.

In addition to data and analysis relating to individual incoming calls, the techniques and systems described herein, which may be implemented in a web-based software application or the like, may also provide access to performance reports—e.g., reports summarizing aggregate incoming call activity or consumer Internet browsing activity over a specified date range. Some example reports are shown in FIGS. 10-17, where those of ordinary skill in the art will recognize that these reports are not intended to be limiting and are merely representative of types of reports that can be generated using the calling and browsing data collected by the systems and methods disclosed herein. In general, the example reports of FIGS. 10-17 are based on an example where a dental practice uses various techniques and systems described herein.

Figure 9:
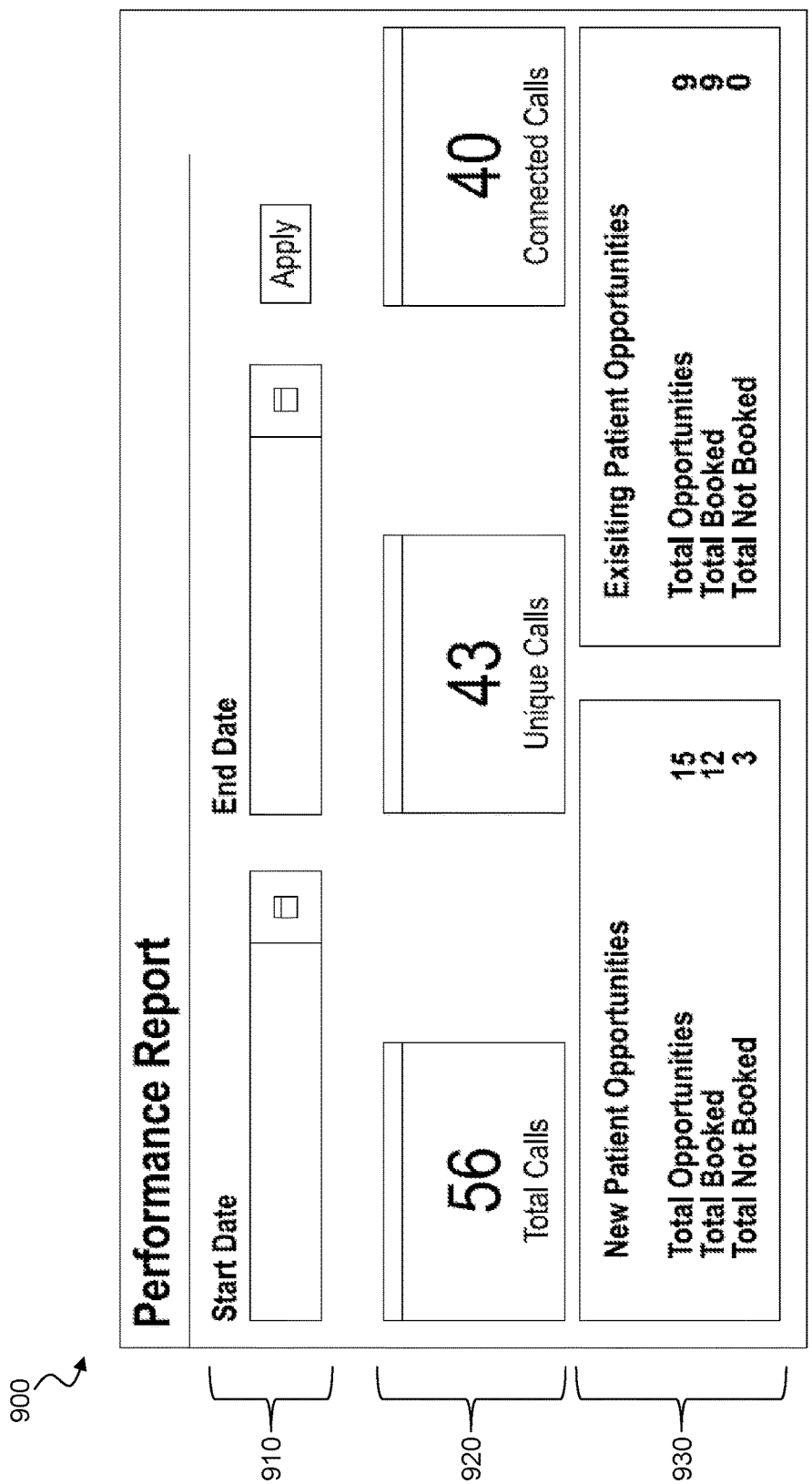
FIG. 9 shows a performance report.

FIG. 9 shows a performance report. Specifically, the figure shows an example of a report 900 for a dental practice or the like. The report 900 may include parameters 910 for selecting data ranges of interest, call information 920, and business opportunity information 930.

The parameters 910 may include any criteria for filtering data, such as a time range, keyword, geographic location, and so forth. Specifically, in the figure, call activity over a specified date range may be retrieved entering dates in the 'Start Date' and 'End Date' fields and selecting the 'Apply' button. The resulting report 900 may show call information 920 and business opportunity information 930 for that specified time period. Other criteria may also or instead be used for the parameters 910 to filter the call data as described herein and as will be apparent to one skilled in the art.

The call information 920 may include the total number of calls, e.g., including one or more of incoming calls received by a dental practice and outgoing calls made to patients or potential patients of the dental practice. The call information 920 may further include a breakdown of, e.g., one or more of unique patients or potential new patients that called the dental practice, calls successfully connected, and the like.

The business opportunity information 930 may include the classification of callers as potential new patients or existing patients. The business opportunity information 930 may further include one or more of potential new patients that booked an appointment, potential new patients that did not book an appointment, existing patients that booked an appointment, and existing patients that did not book an appointment.

Figure 10:
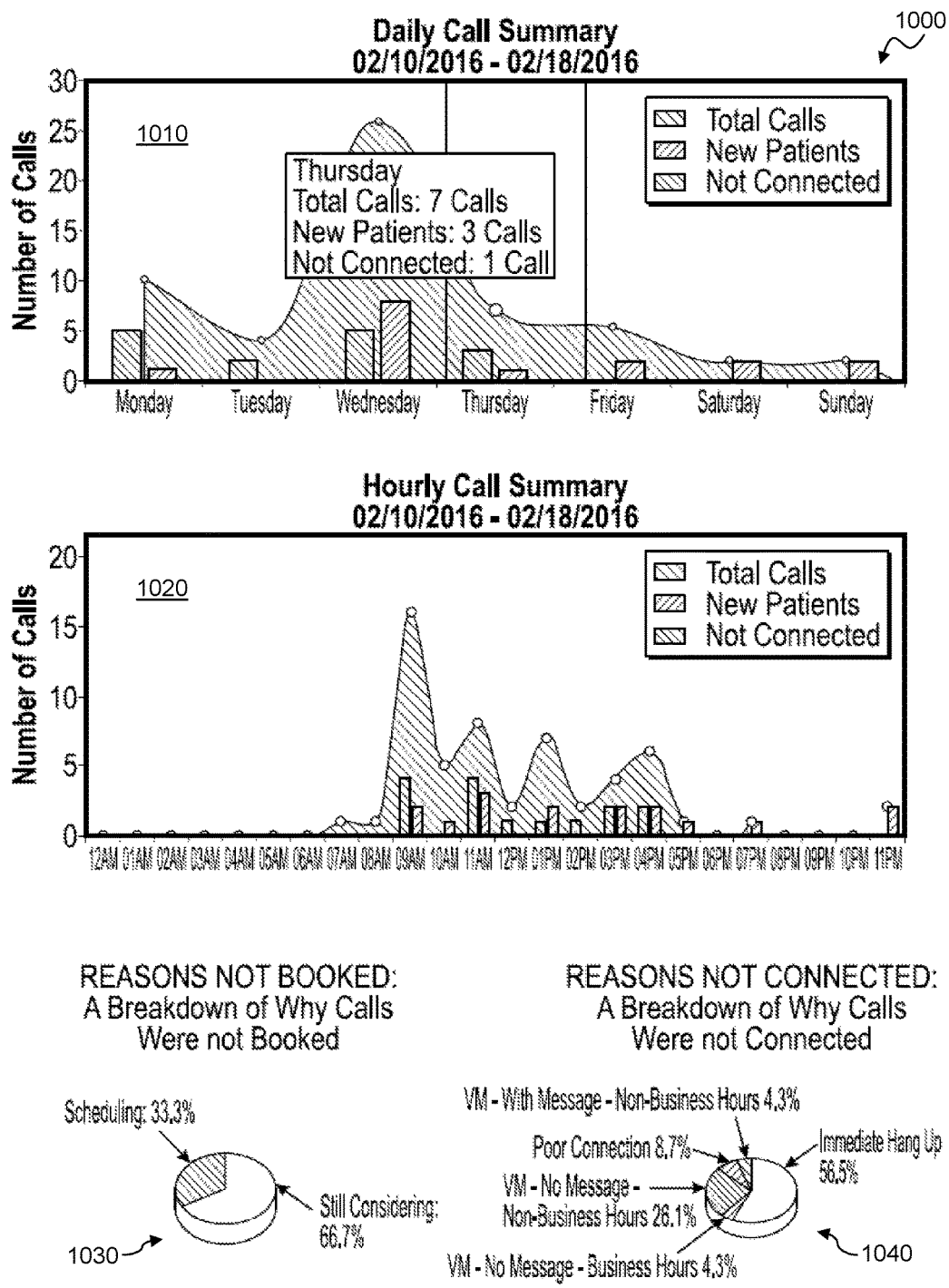
FIG. 10 shows call summary graphs.

FIG. 10 shows a call summary. Specifically, the figure shows an example of a report 1000 for a dental practice or the like, where the report includes one or more graphs, e.g., a first graph 1010 and a second graph 1020. The graphs may graphically display call activity in one or more formats such as the bar charts, line graphs, and pie charts shown in the figure.

The first graph 1010 may represent a daily call summary including both a bar chart and a line graph indicating the number of telephone calls received/made for each day of the week (or other specified time period), the number of contacts classified as new customers, and calls that were not connected.

The second graph 1020 may represent an hourly call summary including both a bar chart and a line graph indicating, for each hour of the day over a specified date range, the total number of calls, contacts classified as new customers, and calls that were not connected.

The report 1000 may also include various pie charts, e.g., a first pie chart 1030 and a second pie chart 1040 as shown in the figure. The pie charts may display various metrics as percentages of the overall call data, including, e.g., the percentage of callers who left a voice message during non-business hours, the percentage of callers who declined to leave a message during non-business hours, and so on.

By displaying the call data in graphical format, trends in the data may be easier to detect by a user. For instance, it may be evident to a user from viewing the hourly call summary in the second graph 1020 of the example report 1000 that volume of incoming calls is generally the highest between 9 a.m. and 10 a.m.

FIG. 11 shows a report for phone number metrics. The report 1100 may be based on 'parent' phone numbers that show the origin of incoming phone calls to a merchant, based on a corresponding phone number for a number of marketing channels or the like. The report 1100 may include a table 1102 having: a first column 1110 showing calls from specific parent phone numbers; a second column 1120 showing a breakdown of new opportunities from each of these the phone numbers; a third column 1130 showing a breakdown of existing opportunities from these phone numbers; a fourth column 1140 showing whether calls were connected or not connected; and a fifth column 1150 showing whether calls were general calls, e.g., calls that are not related to sales opportunities. The report 1100 may be searchable as indicated by the search box 1104 included in the figure.

The parent telephone numbers in the figure may be referenced using descriptive terms that identify the marketing channel associated with the parent telephone number, such as "Website," "Billboard 1," or "Billboard 2." For each parent telephone number, the report 1100 may show the number of potential new patient calls and existing patient calls that resulted in a booking or did not result in a booking for the example dental practice, the number of calls that were not connected, and the number of general calls. From this information, a merchant can review, e.g., the relative efficacy of various marketing channels.

FIG. 12 shows a report for staff metrics. Similar to the figure above, the report 1200 for staff metrics may provide the same or similar statistics as above but broken down by the merchant representative who fielded/placed the telephone call, thereby providing a merchant with insight into the performance of individual representatives. Specifically, the report 1200 may include a table 1202 having: a first column 1210 showing a staff member, e.g., a merchant representative who fielded/placed telephone calls; a second column 1220 showing a breakdown of new opportunities of calls by the staff member; a third column 1230 showing a breakdown of existing opportunities of calls by the staff member; and a fourth column 1240 showing whether calls were general calls.

The methods and systems for generating staff call metrics such as those described above may also or instead facilitate providing incentives and awards to staff members that are associated with such metrics. An electronic dashboard embodiment of these methods and systems, such as one that offers access to staff metrics, may also or instead facilitate access to an incentives capabilities giving administrators quick access to award data. Such access may enable an administrator to generate award certificates (and/or other forms of incentives or rewards) based on, e.g., business-specific award templates that can be manually updated or automatically populated using a computer algorithm that uses the staff metrics as input and determines suitable content for use in the template. Users may receive electronic and/or physical awards based on the award certificates produced from such templates.

FIG. 13 shows a recap report. The recap report 1300 may include may summarize call information and business performance for a number of incoming calls. The report 1300 may include parameters 1310 for filtering data used in the report 1300 (e.g., by date ranges), business opportunity information 1330, and keyword information 1340.

The business opportunity information 1330 may include business values 1332 won or lost by calls included in the filtered data used for generating the report 1300. For example, the recap report 1300 shown in the figure sets out the amount of income generated ($7,000 in the figure) and lost ($0 in the figure) by calls over a given date range.

The keyword information 1340 may include keywords 1342 that were used most frequently in the telephone calls, keywords 1342 that generated the most business value, or combinations thereof, e.g., weighted combinations. The keyword information 1340 may also or instead include keywords 1342 that consumers used most frequently in Internet searches prior to accessing a merchant's website.

FIG. 14 shows a report including referral metrics. The report 1400 may provide insight into referral sources that consumers most frequently use to access a merchant's web site as well as the efficacy of such sources. Specifically, the report 1400 may include a table 1402 having: a first column 1410 showing a given referral source, e.g., a search engine; a second column 1420 showing the total number of consumer visits to a merchant's web site coming from the given referral source; a third column 1430 showing information related to consumers that accessed the merchant's web site from the given referral source, e.g., whether the consumer was a unique visitor to the merchant's web site; a fourth column 1440 showing the total number of calls from these consumers; and a fifth column 1450 showing a conversion rate as a percentage. The conversion rate may be calculated based on the percentage of unique consumer visits to the merchant's website that were followed by an incoming call to the merchant. In this manner, a merchant may gain insight into frequently used referral sources and their efficacy. The conversion rate may also or instead take into account the number of consumers that actually became customers/patients of a merchant.

FIG. 15 shows a report including traffic keywords and queries. The report 1500 may include, for a given set of parameters 1502 (e.g., a given date range), search terms and search strings most often inputted by consumers into a search engine prior to accessing a merchant's website. To this end, the report 1500 may include a first table 1510 showing search queries used and an associated count, and a second table 1520 showing keywords used and an associated count.

Figure 16:
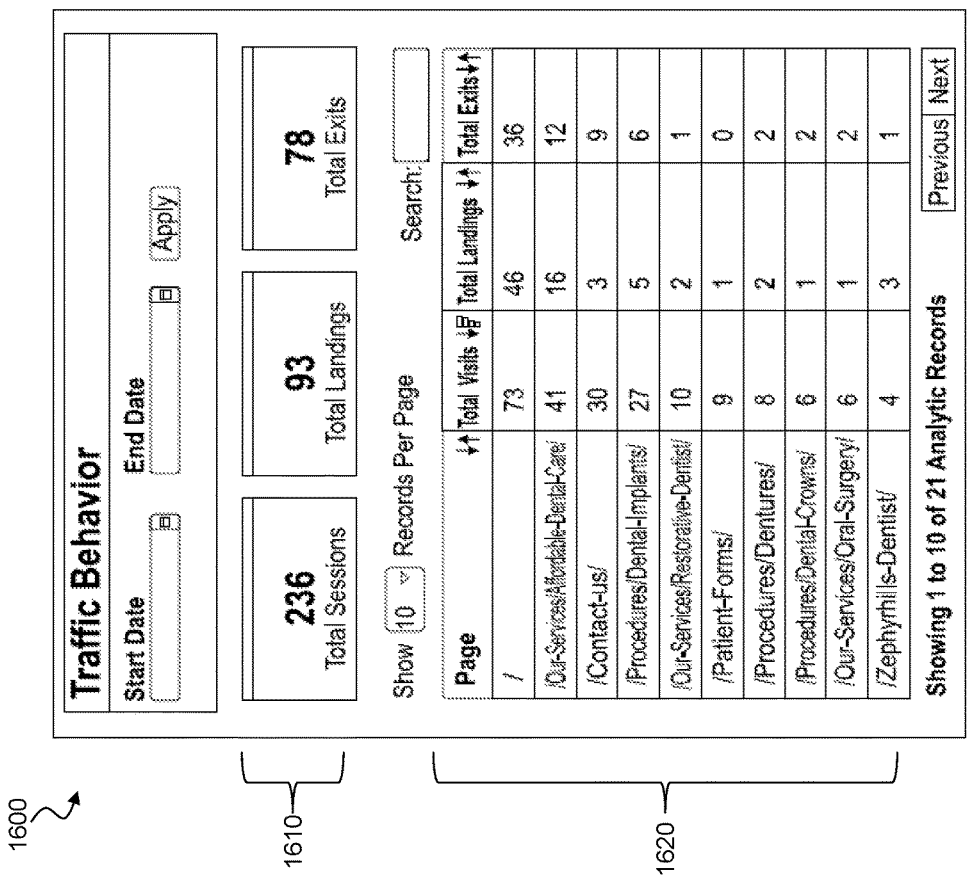
FIG. 16 shows a traffic behavior report.

FIG. 16 shows a traffic behavior report. The report 1600 may provide data regarding consumer Internet browsing activities after arriving at a merchant's web site over a given date range. The report 1600 may include browsing data 1610 including a total number of times consumers accessed a merchant's website, a number of different consumers that accessed the web site, and a number of consumers that then navigated away from the web site. The report 1600 may further include a table 1620 providing the same or similar statistics for each webpage within the merchant's web site.

Implementations may thus provide an option for a user to generate reports showing consumer Internet browsing and calling activity, and an option to download such reports for viewing offline apart from a web-based portal. The reports can be, for example, a spreadsheet with each consumer call listed in separate rows and various categories of data listed in corresponding columns, such as: a universally unique identifier (UUID); a term representing the parent telephone number (e.g., from a billboard, a website, etc.); a referral source; a date and time of the call; a call duration; a caller name; a ring-to number called; a URL to the call recording audio file; or any other information collected during a consumer tracking process.

Figure 17:
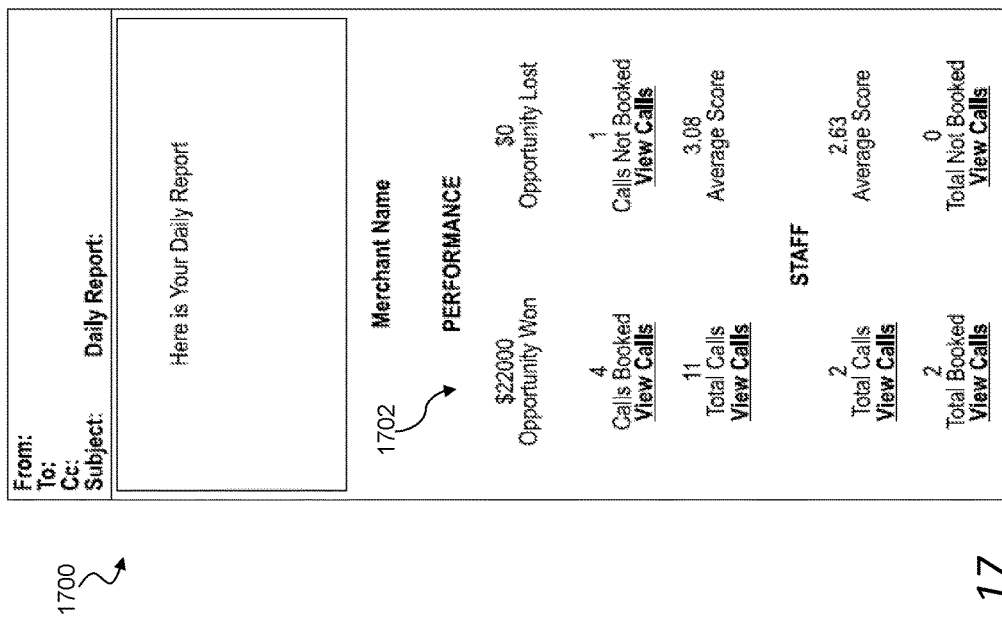
FIG. 17 shows a periodic summary report.

FIG. 17 shows a periodic summary report. Specifically, the figure shows a daily report 1700 that may be included in an email or other message to a user.

Implementations may be configured to generate various alerts or periodic reports that are sent to an internal or external email or short message service (SMS) handler for transmission to a user, such as a merchant representative. For example, implementations may generate an alert each time an "opportunity lost" event occurs that is over a certain dollar threshold. The alert may be sent to a merchant representative by a SMS text message, by email, by push notification, or the like. The merchant representative may thus have an opportunity to contact the consumer associated with the lost opportunity promptly after such a call, e.g., to determine why the consumer did not commit to a purchase and to attempt to convince the consumer to make such a purchase. The alert may include information pertinent to making such a call including without limitation the consumer's information, information regarding services sought, information regarding pricing, information regarding scheduling, and so on.

Implementations may also or instead generate periodic reports 1700 such as that shown in the figure, which are transmitted to a merchant representative or other user on a predetermined basis. The report 1700 may provide performance metrics 1702 for consumer activity during a given time period (e.g., daily), including for example one or more of: a business value of opportunities won; a business value of opportunities lost; a number of callers that made a purchase; a number of callers that did not make a purchase; a number of calls a merchant representative fielded/made; an average performance grade for a merchant representative in fielding/making calls; a number of purchases secured by a merchant representative; and a number of callers handled by a merchant representative that did not make a purchase.

Business location provides another potentially relevant metric for analysis. Particularly where a business may have more than one location, determining the location and configuring information about the location may provide improved call analysis and therefore improve utility to a business owner of an annotated call and other call summary information. Each location of a business may be configured with its own profile that may provide a basis for analysis of telephone calls to/from the location. By way of example, a dentist may have two offices and spend his/her time at different offices on different days of the week. Such information may be useful as a location profile element when configuring the methods and systems for immersive call visualization described herein. For example, reports may be generated that show the performance of one location versus another location(s), the performance of certain personnel, or otherwise breakdown performance according to useful criteria. In this manner, locations, employees, and so forth, may be scored according to their performance.

Figure 18:
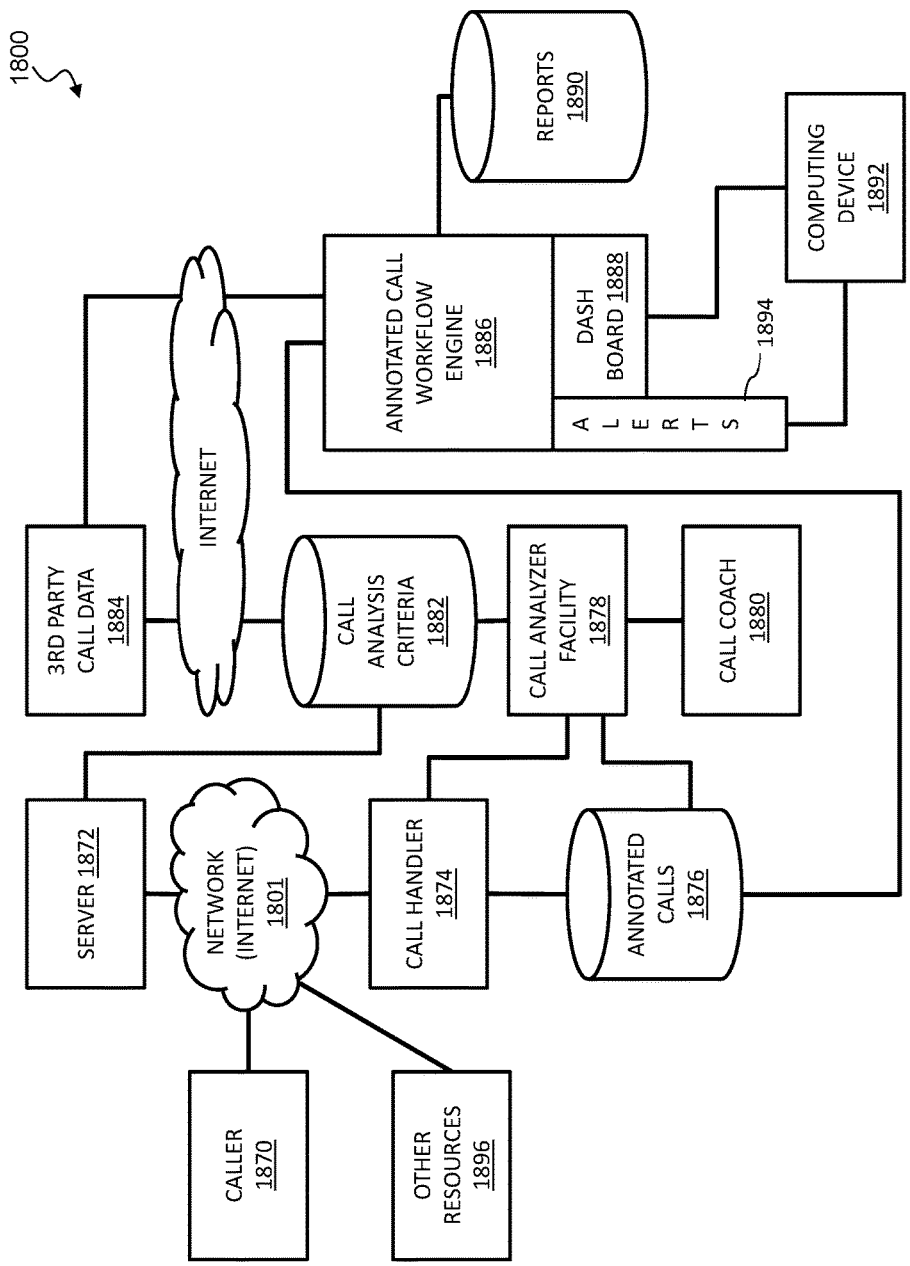
FIG. 18 shows a system for call visualization and generating a keyword cloud.

FIG. 18 shows a system for call visualization and generating a keyword cloud. The system 1800 may be used for any of the techniques described herein, such as the methods above, and may generally feature the user interfaces and reports described herein.

In the system 1800, a caller 1800 may interact with a server 1872 such as a business server, website or the like over a network 1801 such as the Internet, to investigate a business and to acquire a phone number for the business. When the caller 1870 places a call to the business, a call handler or call handler 1874 may route and record the call as a raw call into an annotated call database 1876. The call handler 1874 may alert a call analyzer facility 1878 of the incoming call to activate automated call analysis functions and/or to signal the incoming call to a call coach resource 1880 such as a user interface for call coaching. Call analysis may proceed manually (e.g., using the call coach resource 1880 to manually access the recorded call through a user interface of the call analysis facility 1878), automatically through execution of call analysis algorithms by a processor of the call analysis facility 1878 or the call coach resource 1880, or a combination thereof. Call analysis may be based on call analysis criteria 1882 that is captured from business-specific data, such as from the server 1872 and/or from third party call data 1884 captured over the Internet. Completed call analysis may result in an annotated call as described herein that is stored in an annotated call database 1876 or the like.

An annotated call workflow engine 1886 may be activated to process annotated calls to produce reports 1890 including without limitation data shown in the various reports and user interfaces described herein. More generally, the call workflow engine 1886 may generate reports 1890 such as call reports, business reports, periodic reports, data archives, compliance reports, alerts, and the like. A user, such as a business representative or owner, via any networked computing device 1892 with a basic web browser capability, may access the reports 1890 or excerpted, filtered, summarized, or otherwise processed versions of data in the reports 1890 via a dashboard 1888. These same or other users may receive alerts 1894 from the annotated call workflow engine 1886 based on certain escalation criteria, such as call value, status, state, and the like. The computing device 1892 may also or instead be a device of a merchant representative or the like, e.g., that is a party to telephone calls being recorded and evaluated using the systems and methods described herein.

The network 1801 may be any data network(s) or inter-network(s) suitable for communicating data and information among participants in the system 1800. This may include public networks such as the Internet, private networks, telecommunications networks such as the Public Switched Telephone Network or cellular networks using third generation (e.g., 3G or IMT-2000), fourth generation (e.g., LTE (E-UTRA) or WiMax-Advanced (IEEE 802.16m)) and/or other technologies, as well as any of a variety of corporate area or local area networks and other switches, routers, hubs, gateways, and the like that might be used to carry data among participants in the system 1800.

Each of the participants of the system 1800 may include a suitable network interface comprising, e.g., a network interface card, which term is used broadly herein to include any hardware (along with software, firmware, or the like to control operation of same) suitable for establishing and maintaining wired and/or wireless communications. The network interface card may include without limitation a wired Ethernet network interface card ("NIC"), a wireless 802.11 networking card, a wireless 802.11 USB device, or other hardware for wired or wireless local area networking. The network interface may also or instead include cellular network hardware, wide area wireless network hardware or any other hardware for centralized, ad hoc, peer-to-peer, or other radio communications that might be used to connect to a network and carry data. In another aspect, the network interface may include a serial or USB port to directly connect to a local computing device such as a desktop computer that, in turn, provides more general network connectivity to the system 1800.

The computing device 1892, or any other computing device, user device, or the like described herein, may include any devices within the system 1800 operated by users for practicing the techniques contemplated herein. Specifically, the computing device 1892 may include any device for managing, monitoring, or otherwise interacting with tools, platforms, and devices included in the systems and methods contemplated herein. By way of example, computing devices 1892 may include one or more desktop computers, laptop computers, network computers, tablets, mobile devices, portable digital assistants, messaging devices, cellular phones, smart phones, portable media or entertainment devices, or any other computing devices that can participate in the system 1800 as contemplated herein. As discussed herein, the computing device 1892 may include any form of mobile device, such as any wireless, battery-powered device, that might be used to interact with the system 1800. It will also be appreciated that a computing device 1892 may coordinate related functions (e.g., call recording, call analysis, coaching, etc.) as they are performed by another entity such as a server or other resource.

Each computing device 1892 may generally provide a user interface, such as any of the user interfaces described herein. The user interface may be maintained by a locally executing application on one of the computing devices 1892 that receives data from, e.g., the servers or the like described herein. In other embodiments, the user interface may be remotely served and presented on one of the computing devices 1892, such as where a server or another resource includes a web server that provides information through one or more web pages or the like that can be displayed within a web browser or similar client executing on one of the computing devices 1892. The user interface may in general create a suitable visual presentation for user interaction on a display device of one of the computing devices 1892, and provide for receiving any suitable form of user input including, e.g., input from a keyboard, mouse, touchpad, touch screen, hand gesture, or other use input device(s).

The servers described with reference to the figure, or as otherwise described herein, may include data storage, a network interface, and a processor and/or other processing circuitry. In the following description, where the functions or configuration of a server are described, this is intended to include corresponding functions or configuration (e.g., by programming) of a processor of the server. In general, the servers (or processors thereof) may perform a variety of processing tasks related to the call visualization techniques and the use of an interactive keyword cloud for telephone calls as discussed herein. For example, the servers may manage information received from the call handler 1874, and provide related supporting functions such as organizing, searching, and managing data. The servers may also or instead include backend algorithms that react to actions performed by a user at one or more of the computing devices 1892. The backend algorithms may also or instead be located elsewhere in the system 1800.

The servers may also include a web server or similar front end that facilitates web-based access by the computing devices 1892 to the capabilities of the server. A server may also or instead communicate with other resources in order to obtain information for providing to a user through a user interface on the computing device 1892.

The system 1800 may include other resources 1896. The other resources 1896 may include any resources that may be usefully employed in the devices, systems, and methods as described herein. For example, the other resources 1896 may include without limitation other data networks, human actors (e.g., programmers, coaches, and so forth), sensors (e.g., audio or visual sensors), text or audio analysis tools, third party data sources, and so forth. The other resources 1896 may also or instead include any other software or hardware resources that may be usefully employed in the networked applications as contemplated herein. For example, the other resources 1896 may include payment processing servers or platforms used to authorize payment for subscriptions, purchases, or otherwise. As another example, other resources 1896 may include certificate servers or other security resources for third party verification of identity, encryption or decryption of content, and so forth. In another aspect, the other resources 1896 may include a desktop computer or the like co-located (e.g., on the same local area network with, or directly coupled to through a serial or USB cable) with one of the computing devices 1892. In this case, the other resource 1896 may provide supplemental functions for the computing device 1896.

It will be understood that the participants in the system 1800 may include any hardware or software to perform various functions as described herein. For example, one or more of the computing devices 1892 and the servers may include a memory and a processor.

Figure 19:
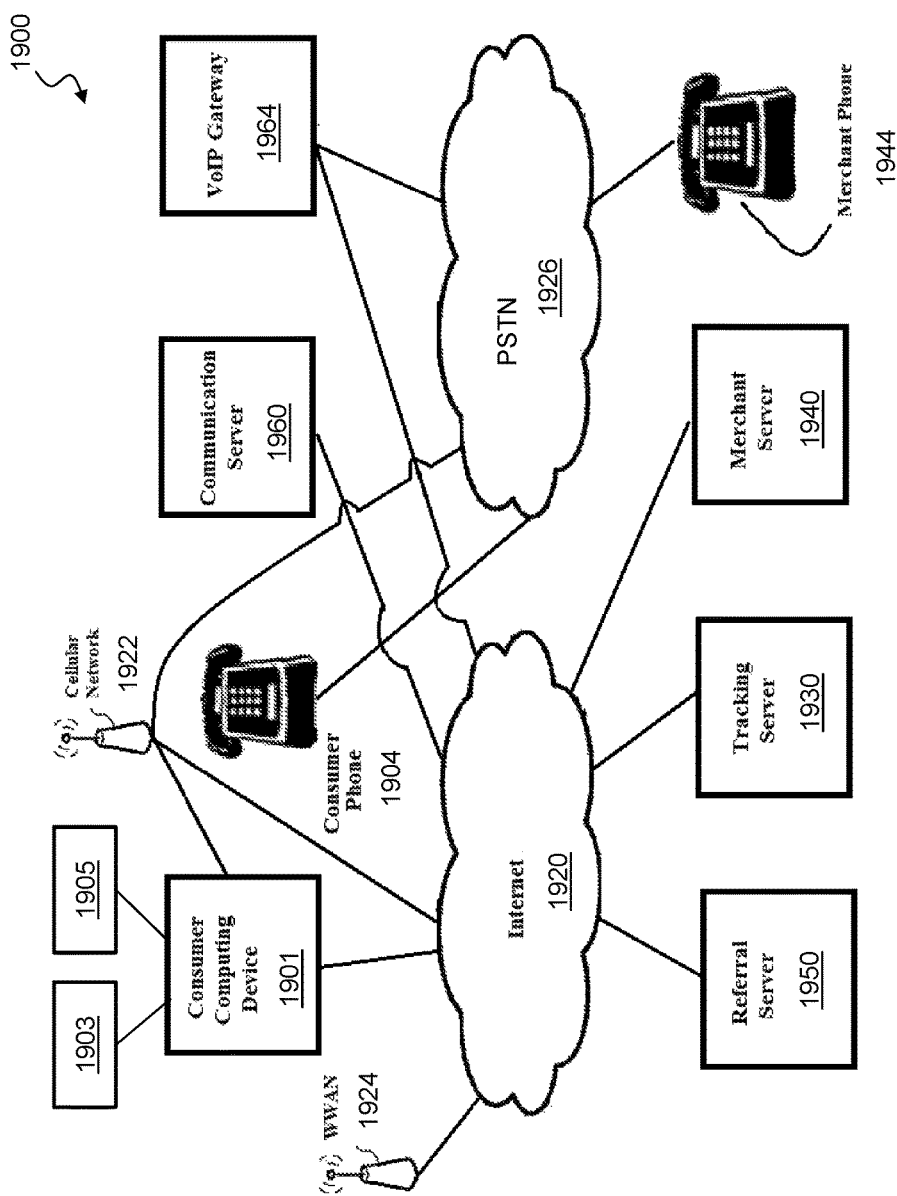
FIG. 19 shows a system for call visualization and generating a keyword cloud.

FIG. 19 shows a system for call visualization and generating a keyword cloud. As shown in the figure, the system 1900 may include a computing device 1901 (e.g., an Internet-enabled device) operated by a consumer, a tracking server 1930, a merchant server 1940, a referral server 1950, a communication server 1960, and a voice-over-internet-protocol (VoIP) gateway 1964, as well as telephones associated with a consumer 1904 and a merchant 1944. The system 1900 may also or instead be implemented using other suitable hardware or software configurations. The system 1900 may utilize multiple computing devices to implement a single system component, or a single computing device may implement multiple system components. Further, a single computing device may implement more than one step of methods described herein; a single step may be implemented by more than one computing device; or any other logical division of steps may be used. In general, this system 1900 may be used to track the source of various incoming calls to a merchant or the like.

Any suitable computing device can be used to implement the consumer computing device 1901, tracking server 1930, merchant server 1940, referral server 1950, communication server 1960, and VoIP gateway 1964. One or more of the system components can be implemented with a personal computing device or a network-based computing device, such as a server. The consumer computing device 1901 can be a portable electronic device, such as a cellular smartphone, tablet computer, or laptop that also has calling capability.

One or more of the consumer computing device 1901, tracking server 1930, merchant server 1940, referral server 1950, communication server 1960, and VoIP gateway 1964 may include a processor 1903 and a memory 1905 that communicates with a number of peripheral subsystems, e.g., via a bus subsystem. These peripheral subsystems may include a memory subsystem (e.g., random access memory), a storage subsystem (e.g., optical, magnetic, or solid-state storage), user input and output subsystems (e.g., a keyboard, mouse, computer monitor, touch-screen display, microphone, or speaker), a networking subsystem, and a communication subsystem. By processing instructions stored on a storage device or in memory 1905, the processors 1903 may perform one or more steps of techniques and methods described herein. Any type of storage device may be used, including an optical storage device, a magnetic storage device, or a solid-state storage device.

The consumer computing device 1901, tracking server 1930, merchant server 1940, referral server 1950, and communication server 1960 may communicate over the Internet 1920 in a known manner—e.g., through one or more remote connections, such as a Wireless Wide Area Network ("WWAN") 1924 based on 802.11 standards or a data connection provided through a cellular service provider 1922. These remote connections are merely representative of a multitude of connections that can be made to the Internet 1920 for communicating among devices. The consumer phone 1904, merchant phone 1944, cellular network 1922, and VoIP gateway 1964 may be connected to a public switched telephone network ("PSTN") 1926 for the transmission of voice telephone calls.

The various computing devices can include integrated software applications that permit communication between system components and that implement graphical user interfaces. The software applications can be programs, functions, routines, applets, or similar modules that perform operations on the computing devices to implement the steps of techniques and methods disclosed herein. The applications may provide a user interface that outputs data and information to, and accepts inputs from, a user. Types of data and information processed by the applications may include text, images, audio, video, or any other form of information that can exist in a computer-based environment. The user interface may include various display screens that output data to a user as well as functions for accepting user inputs and commands, such as text boxes, pull-down menus, radio buttons, scroll bars, tabs, or other suitable functions known in the art.

The tracking server 1930 may include an integrated API that communicates with the consumer computing device

1901, merchant server 1940, and communication server 1960 to facilitate the provisioning of telephone numbers and the tracking of consumer telephone calls and other network activities. The tracking server 1930 may additionally include a web-based software application that provides an online portal for accessing and analyzing call and other tracking data.

Figure 20:
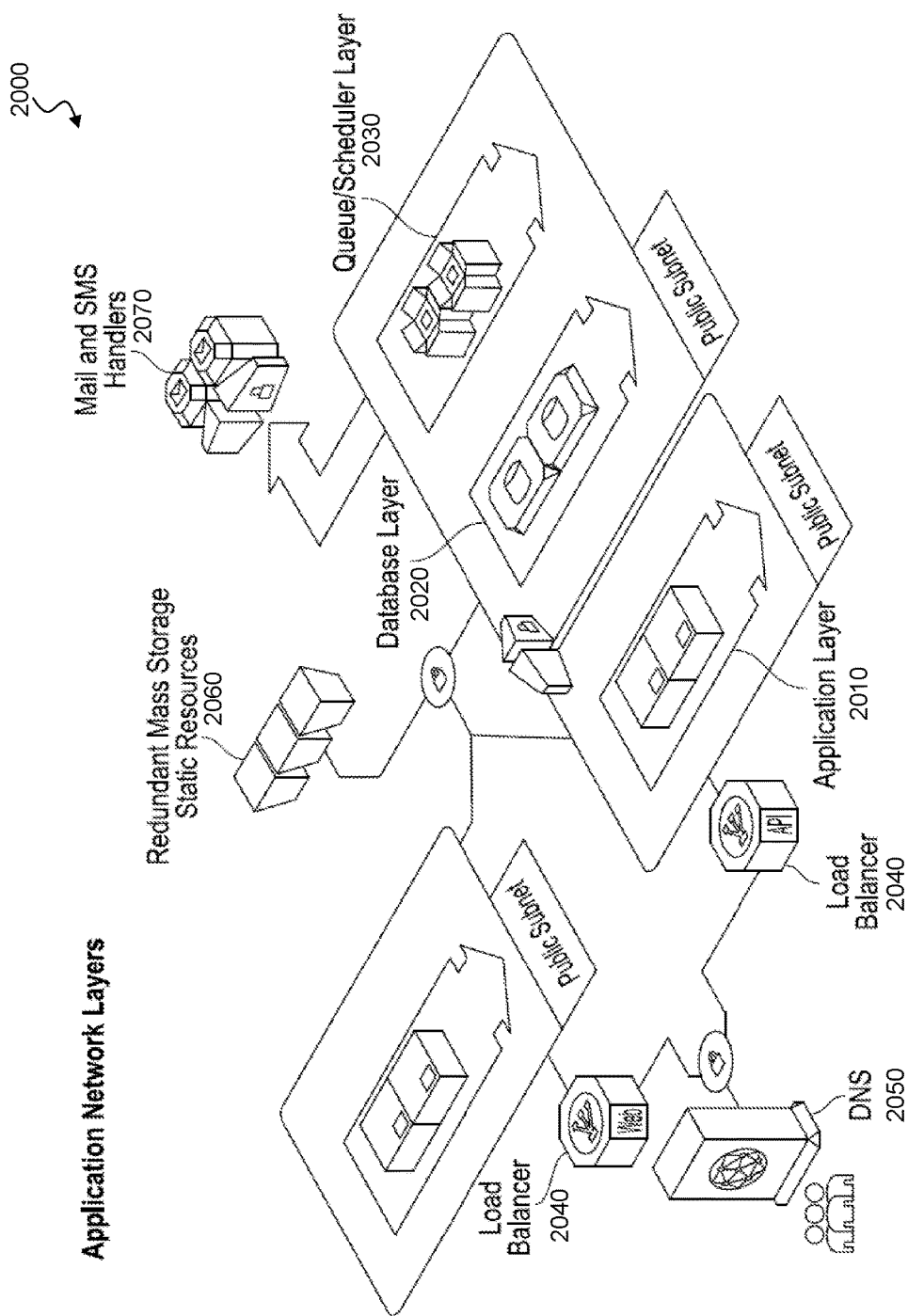
FIG. 20 shows an application program interface (API).

FIG. 20 shows an application program interface (API) or other application network layer. The API 2000 may include an application layer 2010, a database layer 2020, and a queue scheduler layer 2030. The application layer 2010 may connect to the Internet via a load balancer 2040 and a domain name server (DNS) 2050. The API 2000 may include an automatic scaling feature where network traffic is monitored, and where, if the volume of network traffic to the API 2000 exceeds a predetermined threshold, a tracking server or the like will initiate a new instance of the API 2000 to accept a portion of the network traffic to the API 2000. The load balancer 2040 may balance network traffic by sending API calls to the API instance with the lowest present load. The application layer 2010 may be public facing, where the application layer 2010 is securely connected to API back-end layers that include the database layer 2020 and queue scheduler layer 2030.

The database layer 2020 may provide storage for voice recordings, call records, merchant data, and other consumer tracking data. The system may optionally include redundant mass storage or other resources 2060 that can be maintained by a third-party, such as a cloud storage provider. As discussed in more detail below, the queue scheduler layer 2030 may perform a variety of operations that are suitable for performance at regular time intervals or upon the occurrence of a specified event. By way of example, the queue scheduler can be configured to update call records every two minutes to reflect the current status of a consumer call (e.g., ringing, on hold, in-progress, completed) or pull new call recordings from a communication server every fifteen minutes. The queue scheduler can also run reports (e.g., daily or weekly reports) detailing information relating to new call records and call analyses that are then sent to an email or SMS handler 2070 for transmission to a merchant representative.

As part of its marketing efforts, a merchant may establish a website hosted on a merchant computing device or a third-party hosting service. The website may include one or more webpages describing the merchant and its services, such as an "about us" webpage that generally describes the merchant's business, a "meet us" webpage that provides biographies for the merchant's employees, or a "visit us" page that provides a mailing address or map to the merchant's place of business. The merchant's website may additionally provide at least one telephone number that consumers call to purchase or obtain additional information about the merchant's products and services.

A consumer operating a consumer computing device may arrive at a merchant's website through a variety of channels, including: direct navigation to the website by entering the website URL into a text box or address bar of an Internet browser; by selecting or clicking on a link or pay-per-click advertisement, such a banner-ad displayed by a referral server on a third-party website or social media platform; or by selecting a link displayed by the referral server in a directory or Internet search result listing. In embodiments where the referral source is a search engine, a consumer may enter keywords as search terms into a text box and select a search function to initiate an Internet search. In response to the consumer's search request, the referral server may list one or more links associated with the keywords, including a link to the merchant's website. Information concerning the referral source, including an identifier, URL, or keywords used to perform an Internet search can be stored to a database on the consumer computing device.

Incoming telephone calls from the consumer to the merchant may be routed through a communication server and/or a VoIP gateway. The communication server may be connected to the Internet and in communication with the VoIP gateway. The VoIP gateway may convert calls from the PSTN to a VoIP phone call or vice versa. The communication server may control the VoIP gateway. When an incoming PSTN call is received by the VoIP gateway, the communication server may determine the direct inward dialing (DID) number representing the telephone number dialed by the calling party, determine a PSTN telephone number to which the incoming call should be directed, direct the VoIP gateway to place an outbound PSTN call, and bridge the outbound call to the inbound call. Skilled artisans will appreciate that instead of a VoIP gateway, any suitable telephone call processing equipment can be used that is configured to receive an incoming call to one telephone number and redirect the call to a second telephone number (e.g., a personal branch exchange with remote call forwarding capability).

Figure 21:
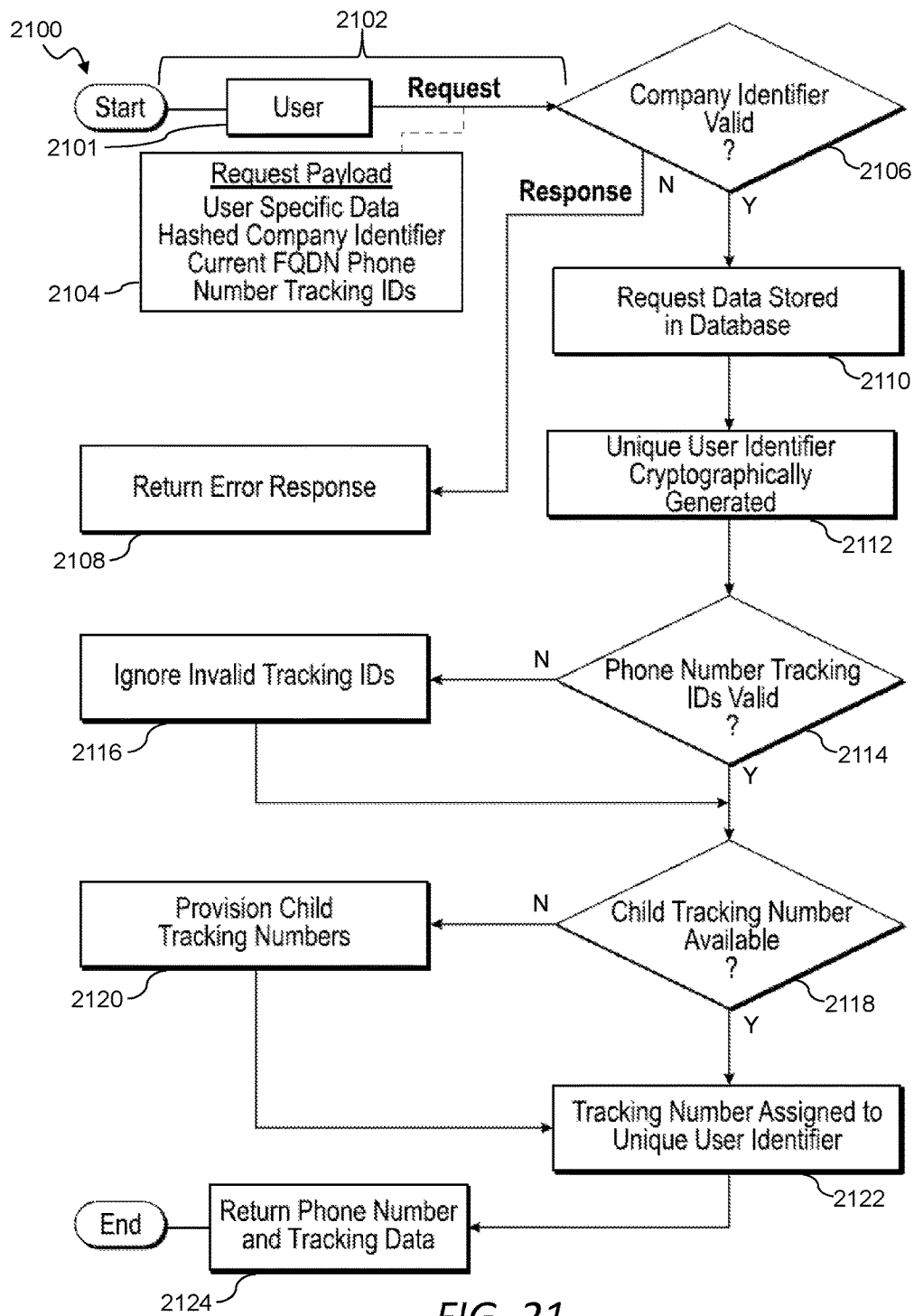
FIG. 21 is a flowchart of a method for phone number provisioning.

FIG. 21 is a flowchart of a method for phone number provisioning. In general, the method 2100 shows how a phone number may be provisioned to a merchant and how consumer tracking information may be collected. As a result of the method 2100, a parent or "ring-to" telephone number displayed on a merchant's webpage may be replaced with a child telephone number that is provisioned to the consumer computing device and used to track incoming calls by a consumer to a merchant. The merchant webpage may include integrated software code that prompts the consumer computing device to download from the communication server a tracking data software application that is used to gather tracking data from the consumer computing device. The tracking data software application may, for example, be integrated into the merchant's website and transmitted from the merchant server to the consumer computing device contemporaneous with the downloading of the merchant website. In other embodiments, the tracking data software application is preinstalled on the consumer computing device, if for instance, a consumer utilizes a software application associated with a particular merchant.

As shown in step 2102, the method 2100 may begin by a consumer computing device (a user) navigating to a merchant webpage, which is shown in the figure as a user 2101 requesting to access a merchant webpage.

As part of loading the merchant website, the merchant server may transmit to the consumer computing device a hashed merchant identifier and a system identification number (SID) for the telephone number listed on a merchant's webpage, which can be a "parent" telephone number, as described herein. The tracking data software application may in turn direct the consumer computing device to transmit to the tracking server a payload such as referral data, browsing data, a hashed merchant identifier, and a parent telephone number SID. The browsing data may include but is not limited to: the type of Internet browser utilized by the consumer computing device; an Internet protocol (IP) address for the consumer computing device; the date and time that the merchant website was accessed by the consumer computing device; the merchant webpage URL being accessed; the title of the merchant webpage being accessed (e.g., the "about us" or "meet us" webpage); and any other data useful for tracking consumer browsing activities. The referral data may include information such as: the referring URL and search terms utilized by the consumer.

The gathering of referral data can be illustrated with reference to the following simplified example where a consumer enters the search term string "Tampa dentist tooth extraction" into a search engine and initiates an Internet search. The referral server may return search results to the consumer computing device with a corresponding URL. The search results may include a sponsored or unsponsored link to the merchant's web site. When a consumer accesses the merchant website via this link, the merchant website may transmit to the consumer computing device a telephone number SID, a hashed merchant identifier, and software code that directs the consumer computing device to download the tracking data software application from the tracking server. The tracking data software application may direct the consumer computing device to transmit referral data to the tracking server that includes the URL returned by the referral server following the Internet search. The text of the URL may be parsed to determine which search engine the consumer used, keywords from the search string, and any other information available from the user's computer (e.g., browser type, operating system, IP address, and so forth).

The hashed merchant identifier may uniquely identify a particular merchant and be generated by applying a hashing algorithm to a merchant identification number or code stored in a database record of the tracking computing device. Hashing techniques may apply a hashing algorithm to known data to create a one-way hash value. Any suitable hashing algorithm can be used, including but not limited to SHA-1 or SHA-2 algorithms. A one-way hash value may be a value of fixed length that is unique to the known data. In other words, if the known data is changed in any respect, the hash value may also change. The hash value, thus, may act as an encrypted fingerprint for the known data that can only be deciphered with an encryption key.

As shown in step 2104, the method 2100 may include requesting a payload from the user, e.g., user specific data, a hashed merchant/company identifier, a current fully qualified domain name (FQDN), a phone number tracking ID, and the like.

As shown in step 2106, the method 2100 may include validating the hashed merchant identifier by using an encryption key to decrypt the hashed merchant identifier and then comparing the resulting merchant identifier to known merchant identifiers stored in a database on a tracking server.

As shown in step 2108, the method 2100 may include, if the merchant identifier cannot be validated, transmitting an error message to the consumer computing device. The consumer computing device may retransmit the hashed merchant identifier in response to the error message, or alternatively, the process may be terminated.

As shown in step 2110, the method 2100 may include requesting data stored in a database on a tracking server, e.g., for comparing the resulting merchant identifier to known merchant identifiers.

As shown in step 2112, the method 2100 may include, if the hashed merchant identifier is validated, generating a unique user identification number (UUID) that is associated with the consumer computing device. The UUID may be a string of characters generated from the consumer computing device IP address and Internet browser type that is then encrypted through hashing. The UUID, browsing data, referral data, and merchant identifier, may be stored to a database on the tracking server.

As shown in step 2114, the method 2100 may include checking to determine whether the merchant identifier is associated with a valid parent telephone number.

As shown in step 2116, the method 2100 may include ignoring invalid tracking IDs.

In an aspect, each merchant is assigned one or more parent telephone numbers allocated by the communication server. The parent telephone number may or may not be the same as a "ring-to" telephone number that directly connects to the merchant phone. The communication server may additionally allocate one or more telephone numbers to the API that the API associates with a merchant's parent telephone number as "child" telephone numbers. The communication server may assign each parent and child telephone number a system identification number (SID).

Utilizing one or more parent numbers in lieu of a ring-to number may have the advantage of allocating the parent numbers to various marketing channels, thus, allowing a merchant to further determine what marketing media a consumer viewed before calling the merchant. So, for example, different parent telephone numbers can be allocated to a merchant's billboard advertisement, radio advertisement, and website. Child telephone numbers may be provisioned to consumers as they view the merchant's website. In this manner, the system can track calls by associating them with various marketing channels as well as track individual consumers who visit a merchant's website without placing any additional burden on consumers to identify marketing media viewed prior to calling a merchant.

The parent telephone number may be statically associated with the merchant identifier, and the child numbers may be dynamically provisioned to consumer computing devices upon navigation to the merchant website. The API can request telephone numbers from the communication server based on particular specifications, such as a request for telephone numbers that have the same area code as the merchant's ring-to number. In one embodiment, each merchant may be allocated a single parent telephone number and five child telephone numbers. The API may determine whether a merchant identifier is associated with the SID received from the consumer computing device to determine if a valid parent telephone number is assigned to the merchant. If the SID cannot be validated, the API may not provision a child number to the consumer computing device, and consumer browsing and calling activities may not be tracked.

As shown in step 2118, the method 2100 may include checking whether a child number is available for provisioning to the consumer computing device. A child number might not be available if, for instance, all child numbers are currently provisioned to other consumer computing devices. In that instance, the API may request that the communication server assign additional telephone numbers based on specified criteria, such as area code. If a child number is available for provisioning, then the API may select a child number and associate the child number and parent SID with the UUID in a database stored on the tracking server. The API may transmit the child number to the consumer computing device for display on the merchant website by the consumer computing device Internet browser. The API may also transmits the UUID to the consumer computing device for use as a token or cookie in tracking consumer computing device activities.

As shown in step 2120, the method 2100 may include provisioning child tracking numbers. To prevent child telephone number provisions from becoming stale and to ensure that child numbers are regularly available for provisioning, a child number may be provisioned to a consumer computing device for a limited period of time, such as a set period of one hour. The date and time that a child number is provisioned may be stored to a database on the tracking server and associated with the relevant UUID. At regular, predetermined intervals, the API queue scheduler may check each UUID database record and compare the current time against the time that a child number was provisioned. If the time difference exceeds a predetermined threshold (e.g., one hour), then the UUID may be deleted or flagged as expired, and the child number may be released for re-provisioning. In some embodiments, the allowable time threshold may be measured from a specified event, such as the last API call, to prevent a child number from being re-provisioning while still in use by a consumer.

As shown in step 2122, the method 2100 may include assigning tracking number to UUIDs.

As shown in step 2124, the method 2100 may include returning the phone number and tracking data, e.g., for re-provisioning.

Figure 22:
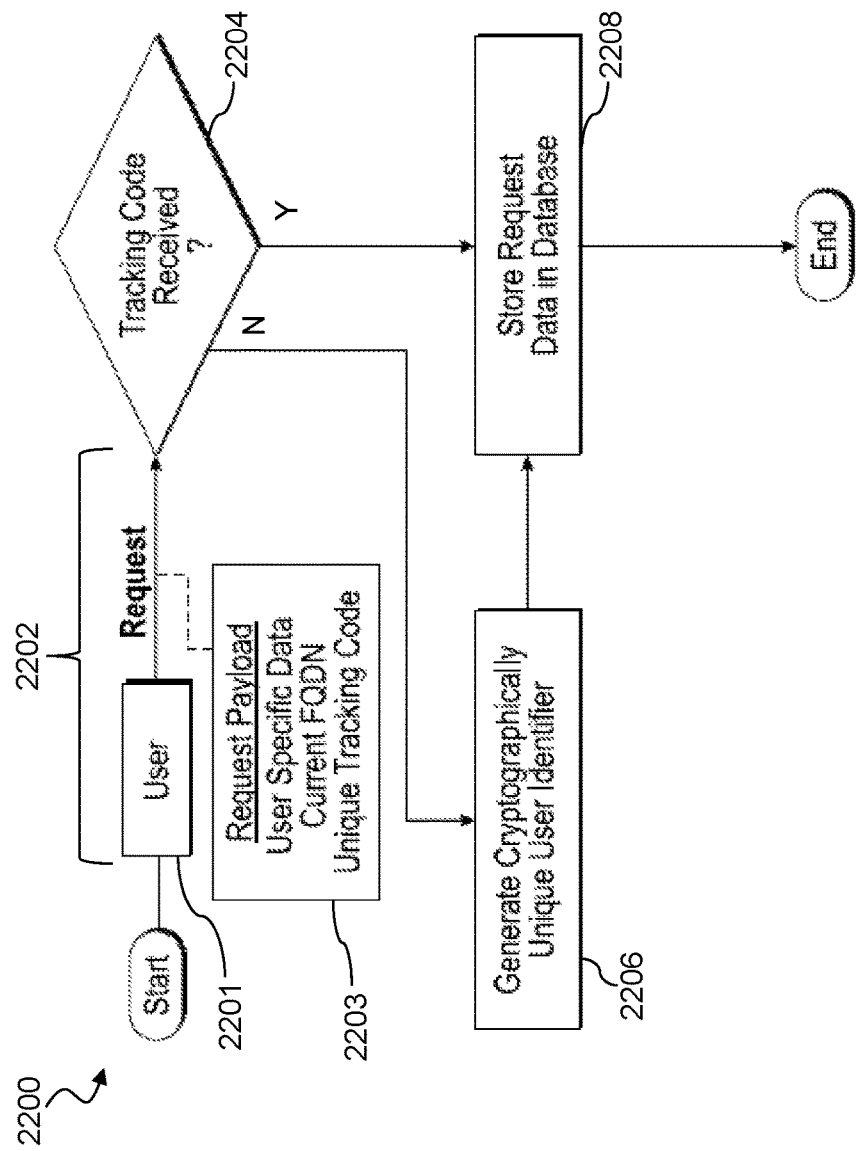
FIG. 22 is a flowchart of a method for analytic data gathering.

FIG. 22 is a flowchart of a method for analytic data gathering. The systems described herein may gather information concerning a consumer's browsing activities while viewing a merchant website through the method 2200 shown in the figure.

As shown in step 2202, the method 2200 may include a user 2201 accessing a merchant webpage, where an API or the like requests a payload 2203 from the user 2201. The payload may include one or more of user specific data, a current FQDN, and a unique tracking code. Thus, as described above, when a consumer computing device first accesses a merchant webpage, the consumer computing device may transmit browsing data to a tracking server. Each time a consumer accesses a subsequent webpage or refreshes a webpage on the merchant website, the consumer computing device may transmit current browsing data to the tracking server along with the UUID.

As shown in step 2204, the method 2200 may include checking whether the traffic code was received. Specifically, the API may check the received UUID against existing UUIDs stored on the tracking server 130.

As shown in step 2206, the method 2200 may include, if the received UUID does not match existing UUIDs or no UUID is received, the API generating a new UUID, provisioning a child telephone number, and transmitting the child telephone number and UUID from the tracking server to the consumer computing device.

As shown in step 2208, the method 2200 may include, if the API matches the received UUID to an existing UUID database record, the API storing the date, time, URL, and webpage title to the database record associated with the UUID.

Figure 23:
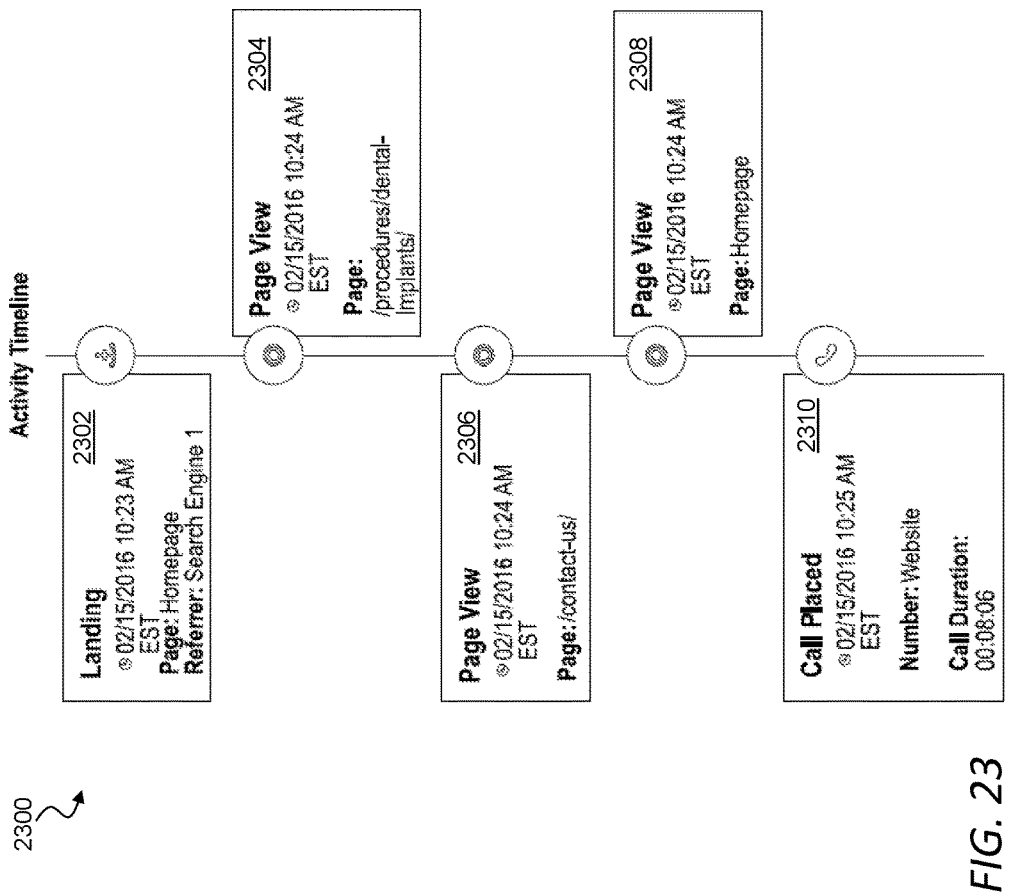
FIG. 23 shows consumer browsing activity.

FIG. 23 shows consumer browsing activity. Specifically, the figure shows a graphical representation of consumer browsing activity that may be accessed using a web-based software application that implements an online portal for reviewing and analyzing consumer call and Internet browsing activity. As shown in the figure, a user interface may display consumer browsing activity an activity timeline 2300. In the example shown in the figure, the first entry 2302 of the activity timeline 2300 shows that the consumer first accessed the merchant's (in this case, a dentist) website homepage on Feb. 15, 2016 at 10:23 a.m., and the referring source was "Search Engine 1." As shown in the second entry 2304, one minute later, the consumer accessed a webpage describing an implant procedure offered by the merchant and, as shown in the third entry 2306, immediately navigated to the merchant's "contact us" page before returning to the homepage as shown in the fourth entry 2308. As shown in the fifth entry 2310, a minute later, the consumer placed a call to the merchant.

Figure 24:
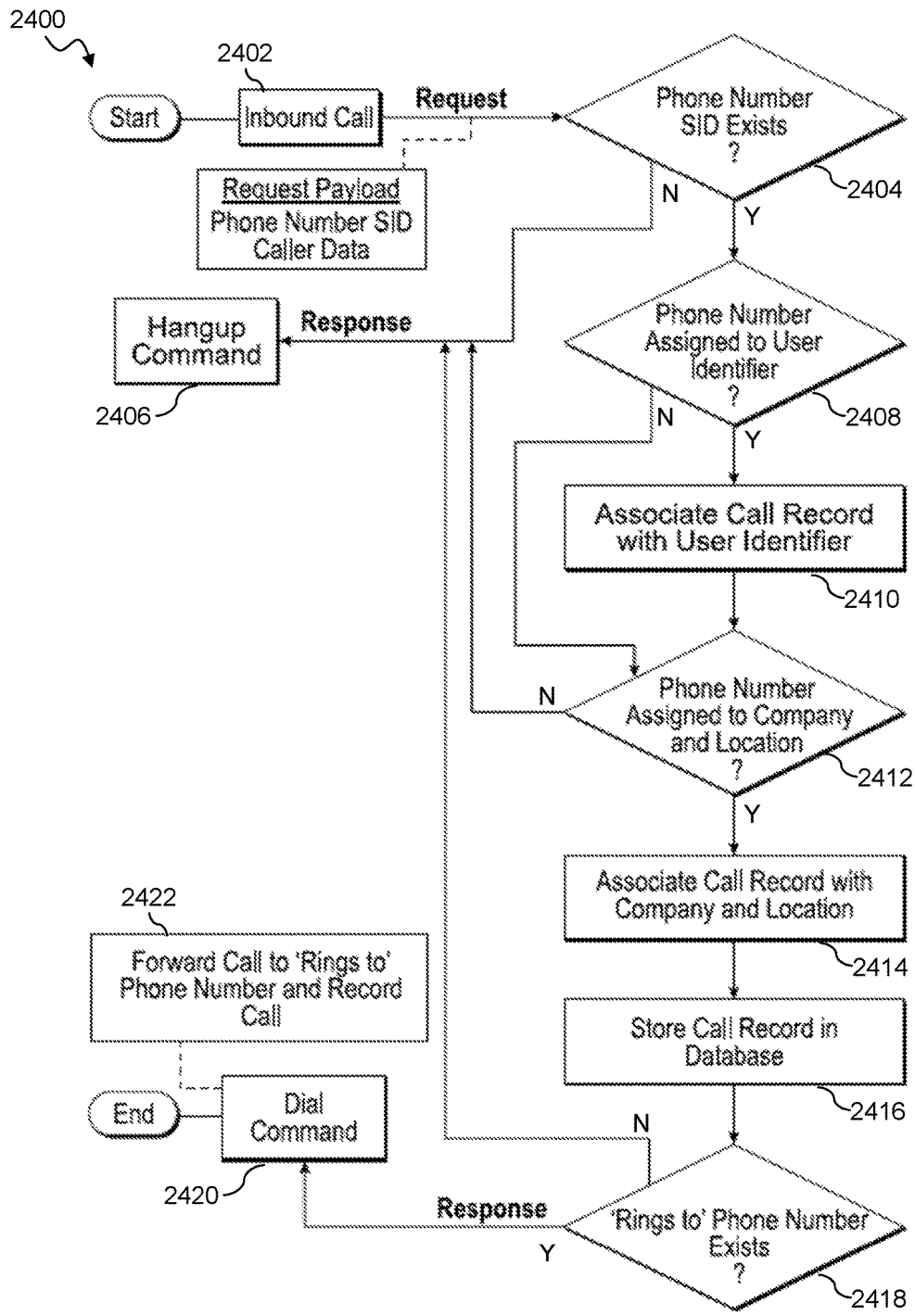
FIG. 24 is a flowchart of a method for handling inbound calls.

FIG. 24 is a flowchart of a method for handling inbound calls. The incoming call may be from a consumer to a merchant or a merchant's representative.

As shown in step 2402, the method 2400 may include an incoming call being directed to a communication server through, e.g., a public switched telephone network (PSTN) or the Internet. The communication server may transmit to the tracking server a call status message and caller data to notify the API that an incoming call was received. The caller data may include a SID for the telephone number being called ("target number") and the telephone number that originated the call ("originating number"). In some cases, the call data may also include the caller's location (e.g., city, state, zip code).

As shown in step 2404, the method 2400 may include determining whether the phone number SID exists in a database record. Thus, after receiving notice of an incoming call, the API may check to determine whether the tracking server has a SID database record for the target number.

As shown in step 2406, the method 2400 may include, if there is no SID database record for the target number, the API transmitting a hang-up command to the communication server to terminate the call.

As shown in step 2408, the method 2400 may include, if there is a SID database record for the target telephone number, the API additionally determining whether the SID is associated with a valid (e.g., existing and unexpired) UUID, which would be the case if the child telephone number with that SID was previously provisioned to a consumer computing device. If so, the method 2400 may proceed to step 2410; if not, the method 2400 may proceed to step 2412.

As shown in step 2410, the method 2400 may include assigning the UUID to a call record for the incoming call.

As shown in step 2412, the method 2400 may include verifying whether the SID is associated with a merchant identifier. If there is no such association, then the API may transmit a hang-up command to the communication server to terminate the incoming call since there is no need for tracking the call if it is not directed to a known merchant. Assuming that the SID is associated with a known merchant identifier, the merchant identifier and merchant location (if known) may be stored to the corresponding call record.

As shown in step 2414, the method 2400 may include associating the call record with the merchant and location.

As shown in step 2416, the method 2400 may include storing the call record in a database or the like.

As shown in step 2418, the method 2400 may include determining whether the merchant identifier is associated with a ring-to telephone number to which the incoming call should be forwarded. If there is no ring-to number, the call may be terminated by transmitting a hang-up command to the communication server.

As shown in step 2420, the existence of a valid ring-to telephone number may prompt the API to transmit a dial command to the communication server.

As shown in step 2422, the method 2400 may include, in response to the dial command, the communication server forwarding the incoming call to the merchant phone via the ring-to telephone number or calling the ring-to number and bridging the placed call with the incoming call from the consumer.

Before connecting the incoming call to the merchant, the communication server may optionally play audio to the consumer, such as a notice that the call may be monitored or recorded for quality assurance purposes. In other embodiments, the consumer is presented with an interactive voice response recording that presents menu options and accepts audio or key inputs from the consumer. Alternatively, such audio can be played for the consumer by the merchant's telephone system after the incoming call has been connected. After the call is connected, the communication server may begin recording the call for playback and storage as an audio file. The communication server may generate a URL that provides a link to download the audio file and transmit the URL to the tracker serving for use by the API.

Figure 25:
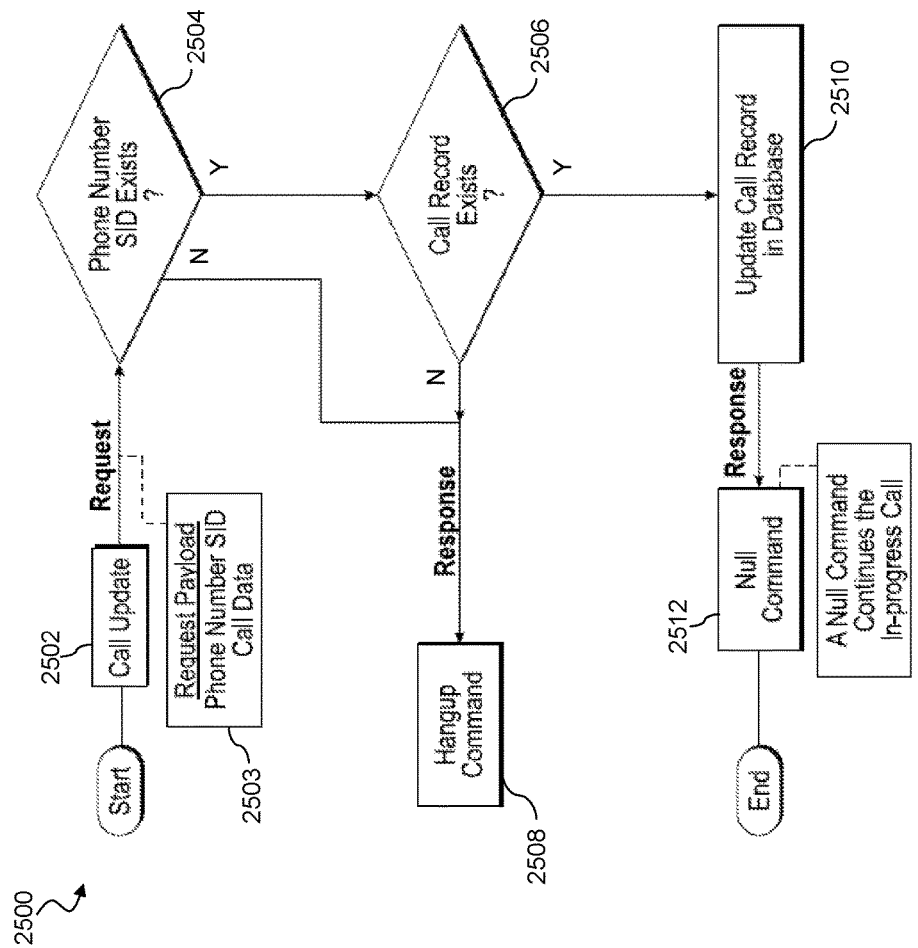
FIG. 25 is a flowchart of a method for call updating.

FIG. 25 is a flowchart of a method for call updating. Thus, the API may implement an in-progress call update handler as shown in the figure.

As shown in step 2502, the method 2500 may include transmitting a call update. Specifically, as part of the call update handler, the communication server may transmit a call status message 2503 to the tracking server, where the tracking server requests such a message as shown in the figure. The call status message 2503 may include a target telephone number SID as well as call data, such as: a status flag indicating whether the call is ringing, on hold, in-progress, or completed; a call duration; or any other useful data. The call status message 2503 can be transmitted at regular time intervals or when the call status flag changes.

As shown in step 2504, the method 2500 may include, upon receipt of a call status message, determining whether the target telephone number SID exists.

As shown in step 2506, the method 2500 may include, upon receipt of a call status message, determining whether the call record exist.

As shown in step 2508, the method 2500 may include, if either the SID or call record cannot be found, terminating the call by transmitting a hang-up command to the communication server.

As shown in step 2510, the method 2500 may include, if both the SID and call record exist, updating the call record to reflect the current status As shown in step 2512, the method 2500 may include transmitting a null command to the communication server that continues the call. When the call ends, the communication server may transmit a call status message to the API with a call status of 'complete,' and the API updates the call record. The queue scheduler may periodically check the call records and identify call records with a status of 'complete.' The queue scheduler may then direct the API to download the audio file of the call at the URL provided by the communication server.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random access memory associated with a processor), or a storage device such as a disk drive, flash memory or any other optical, electromagnetic, magnetic, infrared or other device or combination of devices. In another aspect, any of the systems and methods described above may be embodied in any suitable transmission or propagation medium carrying computer-executable code and/or any inputs or outputs from same.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions.

Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it may be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context. Absent an explicit indication to the contrary, the disclosed steps may be modified, supplemented, omitted, and/or re-ordered without departing from the scope of this disclosure.

The method steps of the implementations described herein are intended to include any suitable method of causing such method steps to be performed, consistent with the patentability of the following claims, unless a different meaning is expressly provided or otherwise clear from the context. So for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims.

What is claimed is:

1. A method comprising:
storing audio data for a plurality of telephone calls;
for each one of the telephone calls, storing a plurality of annotations for a plurality of keywords, wherein each one of the keywords is a business-value-specific keyword spoken during the one of the telephone calls and having a predetermined business value determined at least in part by a monetary value for one or more potential services associated with the business-value-specific keyword, and wherein each one of the annotations identifies one of the keywords and a time during the one of the telephone calls when the one of the keywords was spoken;
presenting the keywords for all of the plurality of telephone calls in a keyword cloud within a first user interface, wherein each one of the keywords displayed within the first user interface contains a hyperlink to related content;
responding to a selection of the hyperlink for one of the keywords by presenting a second user interface containing a listing of each one of the plurality of telephone calls containing the one of the keywords, the second user interface further containing a call data hyperlink for accessing one of the plurality of telephone calls in the listing; and
responding to a second selection of the call data hyperlink by presenting a third user interface that displays the audio data for the one of the plurality of telephone calls as a waveform on a call timeline, the third user interface including a control for audio playback of the audio data at a user selected time along the call timeline, and the third user interface presenting a marker visually indicating on the call timeline the one of the keywords and the time during the one of the plurality of telephone calls when the one of the keywords was spoken.

2. The method of claim 1, wherein the monetary value includes one or more of anticipated revenue, a profit, a loss, an insurance payment, a co-pay, a third-party payment, an industry standard value, and an insurance adjustment.

3. The method of claim 1, further comprising presenting a plurality of audio controls within the third user interface for controlling audio playback.

4. The method of claim 1, wherein the keyword cloud includes a number of occurrences for each one of the keywords.

5. The method of claim 1, wherein each one of the keywords within the keyword cloud is scaled in size according to one or more of a relative frequency of occurrence and the predetermined business value.

6. The method of claim 1, wherein each keyword presented within the keyword cloud is responsive to one or more of a mouse over event and a touch screen event by displaying at least one of a heat map of geographic source, a distribution of time of day, or a number of occurrences.

7. The method of claim 1, wherein the listing of each one of the plurality of telephone calls in the second user interface is visually coded to indicate whether a business opportunity was won or lost.

8. The method of claim 1, wherein one or more of the first user interface and the second user interface includes a control to adjust parameters of the keyword cloud, the parameters including one or more of a time range, a geographic area, demographic information, a merchant, a representative, and a consumer.

9. The method of claim 1, further comprising comparing keyword activity from the keyword cloud to keyword activity to a second keyword cloud.

10. The method of claim 9, further comprising generating a suggestion for a new business opportunity based on the comparison.

11. A method comprising:
storing audio data for a plurality of telephone calls;
for each one of the telephone calls, storing a plurality of annotations for a plurality of keywords, wherein each one of the keywords is a business-value-specific keyword spoken during the one of the telephone calls and having a predetermined business value determined at least in part by a sales opportunity associated with the business-value-specific keyword, and wherein each one of the annotations identifies one of the keywords and a time during the one of the telephone calls when the one of the keywords was spoken;
presenting the keywords for all of the plurality of telephone calls in a keyword cloud within a first user interface, wherein each one of the keywords displayed within the first user interface contains a hyperlink to related content;
responding to a selection of the hyperlink for one of the keywords by presenting a second user interface containing a listing of each one of the plurality of telephone calls containing the one of the keywords, the second user interface further containing a call data hyperlink for accessing one of the plurality of telephone calls in the listing; and responding to a second selection of the call data hyperlink by presenting a third user interface that displays the audio data for the one of the plurality of telephone calls as a waveform on a call timeline, the third user interface including a control for audio playback of the audio data at a user selected time along the call timeline, and the third user interface presenting a marker visually indicating on the call timeline the one of the keywords and the time during the one of the plurality of telephone calls when the one of the keywords was spoken.

12. The method of claim 11, wherein the business value is further determined by a likelihood of converting the sales opportunity.

13. The method of claim 11, further comprising presenting a plurality of audio controls within the third user interface for controlling audio playback.

14. The method of claim 11, wherein the keyword cloud includes a number of occurrences for each one of the keywords.

15. The method of claim 11, wherein each one of the keywords within the keyword cloud is scaled in size according to one or more of a relative frequency of occurrence and the predetermined business value.

16. The method of claim 11, wherein each keyword presented within the keyword cloud is responsive to one or more of a mouse over event and a touch screen event by displaying at least one of a heat map of geographic source, a distribution of time of day, or a number of occurrences.

17. The method of claim 11, wherein the listing of each one of the plurality of telephone calls in the second user interface is visually coded to indicate whether a business opportunity was won or lost.

18. The method of claim 11, wherein one or more of the first user interface and the second user interface includes a control to adjust parameters of the keyword cloud, the parameters including one or more of a time range, a geographic area, demographic information, a merchant, a representative, and a consumer.

19. The method of claim 11, further comprising comparing keyword activity from the keyword cloud to keyword activity to a second keyword cloud.

20. The method of claim 19, further comprising generating a suggestion for a new business opportunity based on the comparison.

* * * * *